US008515733B2

(12) United States Patent  (10) Patent No.: US 8,515,733 B2
Jansen  (45) Date of Patent: Aug. 20, 2013

(54) METHOD, DEVICE, COMPUTER PROGRAM AND COMPUTER PROGRAM PRODUCT FOR PROCESSING LINGUISTIC DATA IN ACCORDANCE WITH A FORMALIZED NATURAL LANGUAGE

(75) Inventor: Wilhelmus Johannes Josephus Jansen, TE Utrecht (NL)

(73) Assignee: Calculemus B.V., Aarle-Rixtel (NL)

( * ) Notice: Subject to any disclaimer, the term of this patent is extended or adjusted under 35 U.S.C. 154(b) by 1116 days.

(21) Appl. No.: 12/446,232

(22) PCT Filed: Oct. 17, 2007

(86) PCT No.: PCT/NL2007/000266
§ 371 (c)(1),
(2), (4) Date: Apr. 17, 2009

(87) PCT Pub. No.: WO2008/048090
PCT Pub. Date: Apr. 24, 2008

(65) Prior Publication Data
US 2011/0010163 A1  Jan. 13, 2011

Related U.S. Application Data

(60) Provisional application No. 60/852,769, filed on Oct. 18, 2006.

(51) Int. Cl.
*G06F 17/27* (2006.01)
(52) U.S. Cl.
USPC .............. 704/9; 704/1; 704/2; 704/8; 704/10; 704/251; 704/257; 707/706; 707/707; 707/708; 715/264
(58) Field of Classification Search
USPC ....... 704/1, 2, 8–10, 251, 257; 707/706–708; 715/264
See application file for complete search history.

(56) References Cited

U.S. PATENT DOCUMENTS 4,706,212 A * 11/1987 Toma ................................ 704/2
5,056,021 A * 10/1991 Ausborn ........................... 704/9

(Continued)

OTHER PUBLICATIONS

Knight et al, An overview of probabilistic tree transducers for natural language processing, Springer, pp. 1-24.*

(Continued)

*Primary Examiner* — Lamont Spooner
(74) *Attorney, Agent, or Firm* — Steinfl & Bruno LLP

(57) ABSTRACT

A method, device and computer program product for parsing linguistic input data by a computer system, in accordance with a grammar of a Formalized Natural Language. The grammar of the Formalized Natural language is a text grammar representing an infinite set of texts of type Text and is stored in electronic form in a computer readable medium constituting a text grammar device. This text grammar is defined by a set of four elements W, N, R and Text. W is a finite set of invariable words of type Word, to be used as terminal, elementary expressions of a text. N is a finite set of non-terminal help symbols, to be used for the derivation and the representation of texts. R is a finite set of inductive rules for the production of grammatical expressions of the Formalized Natural Language, and Text is an element of N and start-symbol for grammatical derivation of all texts of type Text of the Formalized Natural Language. Linguistic input data to be parsed are received from an input device acquired and parsed by the computer system in accordance with the Formalized Natural Language of the text grammar device. A physical representation of a syntactic and semantic structure of the parsed linguistic input data is provided by a data output device.

34 Claims, 9 Drawing Sheets

(56) References Cited

U.S. PATENT DOCUMENTS

| | | | |
|---|---|---|---|
| 5,321,606 A * | 6/1994 | Kuruma et al. | 704/9 |
| 5,475,588 A * | 12/1995 | Schabes et al. | 704/9 |
| 5,511,213 A * | 4/1996 | Correa | 704/9 |
| 5,544,262 A * | 8/1996 | Pagallo | 382/189 |
| 5,619,718 A * | 4/1997 | Correa | 704/9 |
| 5,627,914 A * | 5/1997 | Pagallo | 382/189 |
| 5,761,631 A * | 6/1998 | Nasukawa | 704/9 |
| 5,870,701 A * | 2/1999 | Wachtel | 704/9 |
| 6,016,467 A * | 1/2000 | Newsted et al. | 704/9 |
| 6,282,507 B1 * | 8/2001 | Horiguchi et al. | 704/3 |
| 7,200,559 B2 * | 4/2007 | Wang | 704/257 |
| 2002/0042707 A1 * | 4/2002 | Zhao et al. | 704/9 |
| 2002/0052748 A1 * | 5/2002 | Portilla | 704/270 |
| 2002/0128816 A1 * | 9/2002 | Haug et al. | 704/4 |
| 2002/0143529 A1 * | 10/2002 | Schmid et al. | 704/231 |
| 2003/0036900 A1 * | 2/2003 | Weise | 704/9 |
| 2003/0074184 A1 * | 4/2003 | Hayosh et al. | 704/1 |
| 2003/0115059 A1 * | 6/2003 | Jayaratne | 704/235 |
| 2003/0167266 A1 * | 9/2003 | Saldanha et al. | 707/6 |
| 2003/0212543 A1 * | 11/2003 | Epstein et al. | 704/9 |
| 2004/0172237 A1 * | 9/2004 | Saldanha et al. | 704/4 |
| 2004/0176945 A1 * | 9/2004 | Inagaki et al. | 704/4 |
| 2005/0027512 A1 * | 2/2005 | Waise | 704/9 |
| 2005/0246158 A1 * | 11/2005 | Weise | 704/4 |
| 2005/0256699 A1 * | 11/2005 | Bulusu et al. | 704/2 |
| 2006/0031202 A1 * | 2/2006 | Chang et al. | 707/3 |
| 2006/0106596 A1 * | 5/2006 | Weise | 704/9 |
| 2006/0112131 A1 * | 5/2006 | Harrold et al. | 707/102 |
| 2006/0184353 A1 * | 8/2006 | Weise | 704/4 |
| 2006/0277465 A1 * | 12/2006 | Pandit et al. | 715/531 |
| 2007/0083359 A1 * | 4/2007 | Bender | 704/9 |
| 2007/0083360 A1 * | 4/2007 | Giuseppini | 704/9 |
| 2008/0126078 A1 * | 5/2008 | Starkie | 704/9 |

OTHER PUBLICATIONS

Siskind (Acquiring core meanings of words, represented as Jackendoff-style conceptual structures, from correlated streams of linguistic and non-linguistic input, 1990, Association for Computational Linguistics, pp. 143-156.*

Specht et al., AMOS: A natural language parser implemented as a deductive database in LOLA, 1995, Kluwer Academic Publishers Group, pp. 197-215.*

Munteanu et al., Optimizing Typed Feature Structure Grammar Parsing Through Non-Statistical Indexing, 2004, Association for Computational Linguistics, pp. 1-8.*

Collins, Head-Driven Statistical Models for Natural Language Parsing, 2003, MIT press, vol. 29, pp. 589-637.*

Shieber et al., Principiles and Implementation of Deductive Parsing, 1995, Elsevier, vol. 24 No. 1, pp. 3-36.*

Bangalore et al., Supertagging: An approach to almost parsing, 1999, MIT Press, vol. 25 No. 2, pp. 237-265.*

Waltz, Massively Parallel Parsing: A strongly interactive model of natural language interpretation, 1985, Elsevier, vol. 9 No. 1, pp. 51-74.*

PCT Declaration of Non-Establishment of International Search Report for PCT/NL2007/000266 filed Oct. 17, 2007 in the name of Calculemus B.V.

PCT Written Opinion for PCT/NL2007/000266 filed Oct. 17, 2007 in the name of Calculemus B.V.

* cited by examiner

The representation of a lexical item of type LexWord

Fig. 2

A partial Lexicon of FNL$^{English}$

| [ LexWord | | | ] |
|---|---|---|---|
| [(WordForm | [ GrammarForm | | ])] |
| [(WordForm, | [(Category, | [ [Feature | ]]) ])] |

| | | | |
|---|---|---|---|
| [ | | | |
| ("a", | [("Dnw", | [ ["3.S","5.3","7.N" | ]])), |
| ("are", | [("Ii", | [ ["1.Ii","3.S","5.2","6.T" | ] |
| | | , ["1.Ii","3.P","6.T" | ]])), |
| ("anxiously", | [("Av", | [ [ | ]])), |
| ("about", | [("P", | [ ["2.4" | ]])), |
| ("ball", | [("Ii", | [ ["1.Ii","3.S","5.12","6.T" | ] |
| | | , ["1.Ii","3.P","6.T" | ]) |
| | ,("S", | [ ["1.S","3.S","5.3","8.N" | ]) |
| | ,("Vi", | [ ["1.Vi","3.S","5.3","8.N" | ]])), |
| ("balls", | [("Ii", | [ ["1.Ii","3.S","5.3","6.T" | ]) |
| | ,("S", | [ ["1.S","3.P","5.3" | ]])), |
| ("be", | [("Vi", | [ ["1.Vi","3.S","5.3","8.N" | ]) |
| | ,("Ii ", | [ ["1.Ii","3.SP","5.2","6.T" | ]])), |
| ("Cartesian", | [("Aj", | [ [ | ]])), |
| ("Descartes", | [("Nm", | [ ["1.Nm","3.S","5.3","8.M" | ]])), |
| ("did", | [("I", | [ ["1.I","3.SP","6.P" | ]) |
| | ,("Ia", | [ ["1.Ia","3.SP","6.P" | ]])), |
| ("do", | [("I", | [ ["1.I","3.S","5.12","6.T" | ] |
| | | , ["1.I","3.P","6.T" | ]) |
| | ,("Ia", | [ ["1.Ia","3.S","5.12","6.T" | ] |
| | | , ["1.Ia","3.P","6.T" | ]) |
| | ,("V", | [ ["1.V","3.S","5.3","8.N" | ]])), |
| ("does", | [("I", | [ ["1.I","3.S","5.3","6.T" | ]) |
| | ,("Ia", | [ ["1.Ia","3.S","5.3","6.T" | ]])), |

Fig. 2 (cont.)

| | | | |
|---|---|---|---|
| ("examination", | [("S", | [ ["1.S","3.S","5.3","8.N" | ] ])]), |
| ("famous", | [("Aj", | [ [ | ] ])]), |
| ("free", | [("Aj", | [ [ | ] ])]), |
| ("girl", | [("S", | [ ["1.S","3.S","5.3","8.F" | ] ])]), |
| ("girls", | [("S", | [ ["1 S","3.P","5.3" | ] ])]), |
| ("go", | [("Vi", | [ ["1.Vi","3.S","5.3","8.N" | ] ])]), |
| ("had", | [("It", | [ ["1.It","3.SP","6.P" | ] ])]), |
| ("he", | [("Pr", | [ ["1.Pr","2.1","3.S","5.3","8.M" | ] ])]), |
| ("him", | [("Pr", | [ ["1.Pr","2.34","3.S","5.3","8.M" | ] ])]), |
| ("is", | [("Ii", | [ ["1.Ii","3.S","5.3","6.T" | ] ])]), |
| ("John", | [("Nm", | [ ["1.Nm","3.S","5.3","8.M" | ] ])]), |
| ("know", | [("It", | [ ["1.It","3.S","5.12","6.T" | ] |
| | | , ["1.It","3.P","6.T" | ] ]) |
| | ,("Vt", | [ ["1.Vt","3.S","5.3","8.N" | ] ])]), |
| ("smile" | [("Vi", | [ ["1.Vi","3.S","5.3","8.N" | ] ])]), |
| ("smiles" | [("Ii", | [ ["1.Ii","3.S","5.3","6.T" | ] ])]), |
| ("little", | [("Aj", | [ [ | ] ])]), |
| ("man", | [("S", | [ ["1.S","3,S","5.3","8.M" | ] ])]), |
| ("Mary", | [("Nm", | [ ["1.Nm","3,S","5.3","8.F" | ] ])]), |
| ("men", | [("S", | [ ["1.S","3.P","5.3" | ] ])]), |
| ("nice", | [("Aj", | [ [ | ] ])]), |
| ("nicely", | [("Av", | [ [ | ] ])]), |
| ("not", | [("Ng", | [ [ | ] ])]), |
| ("philosophy", | [("S", | [ ["1.S","3.SN","5.3","8.FN" | ] ])]), |
| ("pass", | [("Vt", | [ ["1.Vt","3.S","5.3","8.N" | ] ])]), |
| ("realize", | [("It", | [ ["1.It","3.S","5.12","6.T" | ] |
| | | , ["1.It","3.P","6.T" | ] ]) |
| | ,("Vt", | [ ["1.Vt","3.S","5.3","8.N" | ] ])]), |
| ("realizes", | [("It", | [ ["1.It","3.S","5.3","62.T" | ] ])]), |
| ("sheep", | [("S", | [ ["1.S","3.S", 5.3","8.FN" | ] |
| | | , ["1.S","3.P", 5.3" | ] ])]), |
| ("sure", | [("Aj", | [ [ | ] ])]), |

Fig. 2 (cont.)

```
("that",      [("Dmf",    [ ["3.S","5.3","7.Y"                ] ])]),
("the",       [("Dmw",    [ ["3.S","5.3","7.Y"                ] ])]),
("think",     [("I",      [ ["1.I","3.S","5.12","6.T"         ]
                          , ["1.I","3.P","6T"                 ] ])
              ,("V",      [ ["1.V","3.S","5.3","8.N"          ] ])]),
("thinking",  [("Aj",     [ [                                 ] ])]),
("this",      [("Dn",     [ ["3.S","5.3","7.Y"                ] ])]),
("these",     [("Dn",     [ ["3,P","5.3","7.Y"                ] ])]),
("to",        [("Dv",     [ ["3.S","4.N","5.3","7.Y"          ] ])
              ,("P",      [ ["2.4"                            ] ])]),
("very",      [("Av",     [ [                                 ] ])]),
("walked",    [("Ii",     [ ["1.Ii","3.SP","6.P"              ] ])]),
("when",      [("SCj",    [ [                                 ] ])]),
("you",       [("Pr",     [ ["1.Pr","3.SP","5.2","7.Y","8.MF" ] ])])
]
```

Legend:

| | | | |
|---|---|---|---|
| Aj | = Adjectivum | Ng | = Negation |
| Av | = Adverbium | Nm | = Nomen |
| Dn | = Determiner-nominale | P | = Preposition |
| Dm | = Demonstrativum | Pr | = Pronomen-Personale |
| Dmw | = Demonstrativum -weak | S | = Substantivum |
| Dmn | = Demonstrativum -near | SCj | = Sub-ordering-Conjunction |
| Dmf | = Demonstrativum -far | V | = Verbum |
| Dv | = Determiner-verbale | Vi | = Verbum-intransitive |
| I | = Inflexion | Vt | = Verbum-transitive |
| Ia | = Inflexion-auxiliary | | |
| Ii | = Inflexion-intransitive | | |
| It | = Inflexion-transitive | | |

The gramprint of a text[n]

Fig. 4
The visual representation of the real domain of a text$^n$.
1. ((John)$^1$ smíles)$^2$. [ 2. (Did (he)$^1$ pass (the examinátion)$^4$ )$^3$? [ ] ]
picture 1. ((John)$^1$ smíles)$^2$ = $x^1 \cap y^2$.
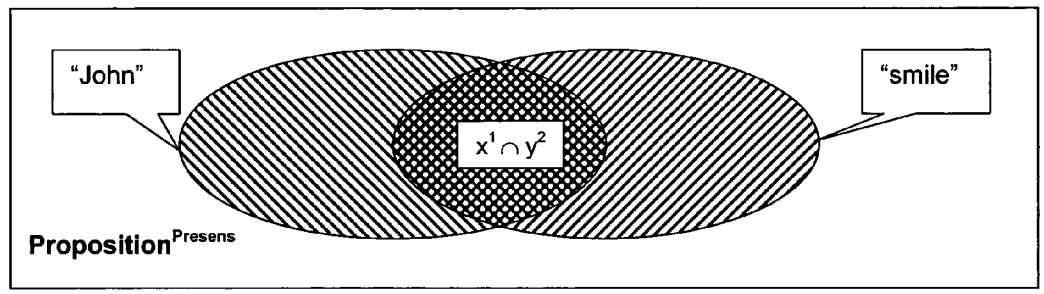
picture 2. (Did (he)$^1$ pass (the examinátion)$^4$ )$^3$? = $x^1 \cap v^3$?
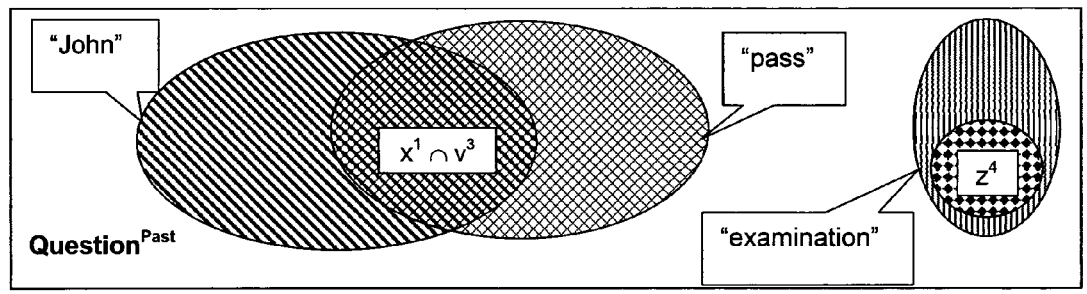

Scheme to build a parser for FNL$^i$

METHOD, DEVICE, COMPUTER PROGRAM AND COMPUTER PROGRAM PRODUCT FOR PROCESSING LINGUISTIC DATA IN ACCORDANCE WITH A FORMALIZED NATURAL LANGUAGE

CROSS REFERENCE TO RELATED APPLICATIONS

The present application is the US national stage of International Application PCT/NL2007/000266 filed on Oct. 17, 2007 which, in turn, claims priority to U.S. Provisional Patent Application No. 60/852,769, filed on Oct. 18, 2006.

FIELD OF THE INVENTION

The present invention relates to data processing and, more particular, to computer controlled processing of linguistic data, providing an unambiguous and formal expression of linguistic data which can be processed by technical means.

BACKGROUND OF THE INVENTION

Modern science has many artificial languages at its disposal that are strictly formal. These formal languages can be generally divided in:
1. languages used for mathematical expressions, such as:

(*)2((+)23)=10, i.e. "two times (two plus three) equals ten", and 2. languages used for logical systems, such as:

$\forall x(\text{Human}(x) \to \text{Mortal}(x))$, i.e. "all human beings are mortal".

All modern computer languages have been composed of subsystems of these two language families.

Formal languages make it possible to utter many verifiable expressions on the basis of a well defined calculus. A calculus, in its most pure definition, is comprised of a finite set of basic elements and a finite set of recursive rules for building an infinite set of combinations of the basic elements.

It is often assumed that human languages, also called natural languages, cannot be defined in a strictly formal manner, because human language is too complex and too enigmatic! Human language has not been drafted systematically, but has been evolved since mankind as a natural phenomenon. The processing of human language by formal methods and logical means is therefore a subject of painstaking scientific research.

Nevertheless, there are great rationalist scientists who are of the opinion that the study of natural language ultimately will lead to a formal definition, which is analogue to the artificial formal languages. These scientists assume that users of a natural language can produce endlessly many different utterances which are nevertheless comprehensible for everyone, and that it is a task of linguistics to detect the grammar rules in the minds of the language users and to order them systematically.

It will be appreciated that this can only be true if and only if all users of a particular natural language have in common (in their minds) the same grammar, i.e. a finite set of basic symbols with an invariable grammar form, and a finite set of rules in order to build complex expressions with a compositional reference to intended phenomena, which reference can be calculated automatically on the basis of the rules and symbols used.

The mathematician Gottfried Wilhelm Leibniz (1646-1716) already expressed this linguistic ideal (with some exaggeration) as follows:

" . . . . Then, [when human language has been defined formally] in a case of difference of opinion, no discussion between two philosophers will be any longer necessary, as (it is not) between two calculators. It will rather be enough for them to take pen in hand, set themselves to the abacus and . . . say to one another: calculemus!"

Many linguists are trying to find methods to analyze texts of a natural language automatically. The development of text processing systems has already led to a revolution in the way we communicate. Nevertheless the most modern systems to process natural language are still very handicapped and poor, because the known statistical and descriptive methods used until now to analyze human expressions are not adapted to the intelligent way in which these expressions are produced.

In particular, these known methods are not adequate to define the syntactic and semantic relations between sentences of a written or spoken text of a natural language in a strictly functional manner.

The functional definition of a human language is only possible on the basis of an agreement between the users of a particular language community to limit their lexicon and their grammar. As a matter of fact all human beings exercise such restraint, intuitively or deliberately, for special purposes and in specific circumstances.

Making a human language simple in a controlled manner in order to produce unambiguous texts is very challenging, especially on the ground of science, business and education in an international environment. Aerospace manufacturers, for example, are required to write aircraft maintenance documentation in Simplified Technical English, in particular to prevent ambiguity, to reduce misunderstandings, to speed up reading, to decrease the time for training and to optimize the maintainability, the re-usability and the translatability of texts. Many people are willing to restrict themselves in advance to one single, clearly defined sub-system of a natural language in order to improve the practical value of their communication.

But for users of a simplified technical language it is not only important that their manuals comply to the rules of the agreed lexicon and grammar, but it is even of more importance to be able to proof objectively that the content of a manual or any written product in general is syntactically and semantically valid.

As will be appreciated, relations between elements of a text increase exponentially if the size of a text increases. Even for very short texts, it is quickly impossible for a human being to calculate exactly by mental arithmetic the syntactic-semantic value of a text. However, the functional definition of a simplified language facilitates the automatic detection and indexation of all interrelated phenomena denoted in a grammatical text of said language and makes it possible to deliver a physical representation of the grammatical structure of said text which can be processed furthermore by many technical means.

SUMMARY OF THE INVENTION

Accordingly, the technical problem and object of the present invention is to provide a novel method, for operating with a computer system, by which linguistic data of a natural language can be consistently calculated, in such a way that a same input always yields a same output. The said method is not limited as to the size of the data to be processed, and the calculated output of the linguistic data can be further processed by technical means.

It is a further object of the present invention to provide a device applying such method for expressing linguistic data, such as spoken data and written text data, in a physical representation.

These and other objects of the present invention are provided, in a first aspect thereof, by a method, in a computer system, for processing linguistic data in accordance with a Formalized Natural Language, the method comprising the steps of:
defining a text grammar of the Formalized Natural Language as a set of texts of type Text,
acquiring linguistic data to be processed,
expressing the acquired linguistic data in accordance with the text grammar of the Formalized Natural Language, and
providing a physical representation of the expressed linguistic data.

The expression "type" as used in the present description and claims has to be construed as a "set of expressions or values, in such a way that the members of the same set have common properties according to the definition of the set". Names of types begin always with a Capital and are printed in italics. Names of functions begin always with a lower cast letter. A function is a procedure that associates an input to a corresponding unique output according to some rule.

The invention is based on the insight that a natural language, like a calculus, can be conceived as an infinite set of texts. A text is build of a finite set of basic expressions, being invariable words available in a natural language, following a finite set of inductive rules, being the grammar of the natural language.

Accordingly, starting point for the calculation according to the invention is a text grammar defining a Formalized Natural Language as a functional calculus for use with a computer for parsing texts of said Formalized Natural Language.

In accordance with the present invention, this text grammar is defined as a set of four elements W, N, R and Text, wherein:
W is a finite set of invariable words of type Word, to be used as terminal, elementary expressions of a text,
N is a finite set of non-terminal help symbols, to be used for the derivation and the representation of texts,
R is a finite set of inductive rules for the production of grammatical expressions of the Formalized Natural Language, and
Text is an element of N and start-symbol for grammatical derivation of all texts of type Text of the Formalized Natural Language.

The invention defines a specific human language as a set of texts of type Text which obey a text grammar comprising a finite set W of invariable terminal words, a finite set N of non-terminal help symbols such as names of types, functions and constructors, and a finite set R of inductive rules for producing grammatical expressions. Text is the start-symbol for the grammatical derivation of all texts of the Formalized Natural Language.

The invention further provides a lexicon of type Lexicon, wherein the finite set W of words of type Word is stored. The lexicon comprises a finite set of lexical words of type LexWord, in such a way that each lexical word is constructed as a tuple of one unique word form and a list of disjunctive grammar forms, where a word form is an invariable string of type String containing at least one character or a selection of characters from a character alphabet and where each grammar form is constructed as a tuple of a unique category type (such as Noun or Verb or Adjective, etc.) and a list of disjunctive sequences of features (with features of type Numerus, Genus, Casus, etc.) and where every feature is constructed as a string referring to a set of disjunctive instances of a feature (such as for the feature of type Numerus: singularis or pluralis or non-numerable).

Contrary to the known statistical and descriptive methods for analyzing natural language, a functional calculus in accordance with the present invention is the adequate approach by which linguistic data can be ultimately transformed in a text comprising one or more sentences adapted to the reader/listener in such a way that the same input always yields the same output.

According to the invention, a text is composed of syntactic phrases. A syntactic phrase is inductively generated according to a set R of production rules of the text grammar of the Formalized Natural Language. An elementary phrase is defined as a function of a syntactically selected word of type Word in a sentence of a text. A complex phrase is defined as a function of one or more phrases. Elements of type Word are used as elementary arguments for syntactically generated phrases in a text sentence.

In accordance with the inductively defined syntax of the Formalized Natural Language the invention provides an inductive definition of the semantics of said language with the aid of two semantic functions sem and sem* by which every phrase P is functionally transformed in the name of a set of phenomena realizing a property y called "to be P", in such a way that every syntactically determined name, which is constructed with a determiner, in particular can be marked with a unique index, because said determined name is referring to a singleton set comprehending a phenomenon of which the unique identity can be distinguished and recognized with the aid of the properties inductively named in the name of said singleton set. Thanks to this inductive definition of the semantics of a formalized natural language every text of said language can be analyzed as a finite set of hierarchically ordered elementary and complex names that refer to a finite set of interrelated phenomena that can be unambiguously distinguished by the properties called in their names. The finite set of hierarchically ordered elementary and complex names of a $text^n$ will be called the domanium nominale $D_N^n$ and the finite set of denoted interrelated phenomena of said $text^n$ will be called the domanium reale $D_R^n$, where superscript n denotes the individuality of the given text.

The clear and unambiguous structuring embodied in the present invention provides for a technical representation of the processed data, in particular with respect to the calculation of the syntactic-semantic validity of the data, i.e. the text product to be analysed, which representation can be further processed by technical means.

In an embodiment of the invention the acquired linguistic data are parsed in accordance with the text grammar of the Formalized Natural Language, in such a way that a so-called gramprint is provided of the linguistic data which gramprint, in an embodiment of the invention, is a labeled tree-structure or a labeled bracket-structure indicating the parsed syntactic and semantic relations between all phrases used in the linguistic data, where every determined complex phrase in particular is marked by an index referring to an identified, similarly indexed phenomenon in the real domain of $text^n$.

In another embodiment of the invention, the acquired linguistic data are parsed in accordance with the text grammar of the Formalized Natural Language in such a way that a hierarchically ordered sequence of Venn-diagrams is provided wherein every successive text sentence is represented by a Venn-diagram that comprises a visual representation of all semantic relations between the linguistic data of said current text sentence. In a Venn-diagram of a text sentence every phrase P of said sentence is made visual as a set S of phenomena realizing the property called "to be P" and every determined complex phrase in particular is made visual as an indexed singleton set comprehending a phenomenon of which the identity can be distinguished and recognized by the properties named in the names of the cross sections of said singleton set according to the grammar of said Formalized Natural Language.

Methods for manipulating the parsed data, in accordance with the present invention, may advantageously be designed and used for translation purposes, for directly developing formal computer programs from linguistic data, for providing a written representation of spoken language, etc.

The data expressed in accordance with the method of the invention may be physically presented as a printed text, a text displayed on a computer screen or the like, a spoken text, but may eventually also result in physical event or signal, such as a control signal for opening a gate, for sounding an alarm, etc.

The invention relates further to a computer or processor controlled device arranged for performing the method according to the invention and a computer program and computer program product arranged for operating on a computer, for being integrated in or added to a computer application and a lexicon or lexicon data pertaining to a particular Formalized Natural Language, arranged and stored in electronic form.

Further features and aspects of the present invention will be disclosed in the following detailed description by means of non-limiting examples and definitions, in conjunction with the enclosed drawings.

BRIEF DESCRIPTION OF THE DRAWINGS

FIG. 2 shows an exemplary lexicon of the Formalized Natural Language English, in accordance with the present invention.

FIG. 4 shows, in an illustrative configuration, a sequence of hierarchically ordered Venn-diagrams of the example text″ in FIG. 3, in accordance with the present invention.

DETAILED DESCRIPTION OF THE INVENTION

Figure 1:
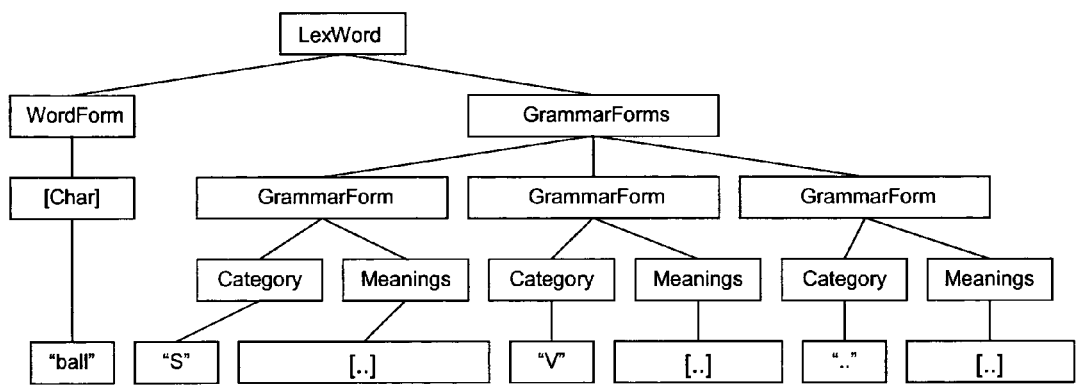
FIG. 1 shows a representation of a lexical item as a tree of syntactical symbols in accordance with the present invention.

Without the intention of a limitation, the invention will now be explained by several examples. In order to properly elucidate the invention, some formal notations will be used, the definition of which will be first explained. The purely functional computer-language Haskell will be used as a meta-language, by way of example only. For information about Haskell, see: http://www.haskell.org that is herein included by reference. Those skilled in the art will appreciate that other notations or expressions may be used.

Formalized Natural Language (FNL)

The basic assumption of the present invention is that a functional calculus can be defined for expressions of a specific human language, analogous to a mathematical calculus. Take for example a mathematical function to calculate an expression with integers:

$$(+) :: Integer \to Integer \to Integer$$

wherein
::= is a function from
→ = to

This can also be read as: (+) is a function that needs two elements (called arguments) of type Integer in order to generate an element of type Integer. Thus:

$$(+) 2 3 = 5$$

We assume that a function can take also other functions as arguments, provided that those functions have the right type. Such other functions may be expressed as, for example:

$$(-) :: Integer \to Integer \to Integer$$

$$(*) :: Integer \to Integer \to Integer$$

$$Thus: (+)((-)3 2)((*)2 5) = 11$$

In the same way functions to produce an expression with words can be defined. For instance some functions to form a determined noun phrase dnp in English:

$$dnp :: DrP \to ATNP \to DNP$$

where
DrP=DeterminerPhrase
ATNP=AttributiveNounPhrase
DNP=DeterminedNounPhrase

Read: dnp is a function that needs an argument of type DrP and an argument of type ATNP in order to generate an element of type DNP.

In order to produce elements of type DrP and of type ATNP we need the functions drp and atnp respectively, etc. All such functions take other typed linguistic functions as their arguments as will be explained in the continuation, just like the mathematical functions take other typed, mathematical functions as their arguments.

The Grammar of a Particular FNL

Our daily language is in actual fact an amalgam of many sub-systems which partly resemble each other, but which are also partly incompatible:
  our childhood language together with the grown-up language,
  the standard language and a local dialect or one or more technical jargons,
  the spoken and the written language,
  the old-fashioned and the modern variants,
  our mother tongue and one or more foreign languages,
  ... etc.

It will be appreciated that natural languages not only differ by nationality such as foreign languages like English, French or Greek, but also in dialects or jargon such as legal natural language, technical natural language, etc. For all these sub-languages and variants or fragments thereof, in accordance with the present invention, a specific Formalized Natural Language may be generated.

Each sub-language has its own grammar, i.e. a vocabulary plus a set of grammar rules. Nevertheless our brains are evidently able to discern these different sub-systems, since in actual practice (if we wish) we can switch easily from one system to the other, and even we can mix them.

As already briefly outlined above, besides the mentioned Simplified Technical English, many situations are imaginable where people are willing to restrict themselves in advance to one single, clearly defined sub-system of a natural language.

Think for instance about text genres which are clearly tapered to specific goals in the domain of different sciences or professions, for instance to produce scientific models, computer-programs, law-books, statutes, contracts, regulations, prescriptions, codes of conduct, timetables, schedules, reports, forms, instructions, directions, business letters, children's books, schoolbooks, fairy tales, garden books, cookery books, recipe books, etc.

All these sub-languages may have an own specific Formalized Natural Language (FNL), hereinafter indicated by $FNL^i$, wherein the superscript i denotes an FNL of sub-language i.

In accordance with the invention, an $FNL^i$ is defined as an infinite set of all and only correct texts that can be generated according to the grammar of this $FNL^i$.

The production of a text will always need the free, creative activity of a human being. However, when it comes to analyzing and manipulating a produced text, then the support of a computer can be called in. For instance, when an author is typing a specific text with the aid of a computer that knows the $FNL^i$-rules, he can get feedback about the agreed grammaticality of his product. His text can be analyzed grammatically by a computer and manipulated in many ways.

To deal automatically with a particular natural language in a spoken or written form, there should be an FNL-model available which is based on the results of the most up-to-date, linguistic research and which is easy to implement in the most powerful computer-languages.

In the following description, an exemplary fragment of English ($FNL^E$) is selected and implemented in the functional model according to the teachings of the invention.

The Text Grammar of an $FNL^i$

The context free text grammar of a formal language $FNL^i$ in accordance with the invention is a 4-tuple (W, N, R, Text), wherein:

W is a finite set of invariable words of type Word, to be used as terminal, elementary expressions of a text, N is a finite set of non-terminal help symbols, to be used for the derivation and the representation of texts, R is a finite set of inductive rules for the production of grammatical expressions of the $FNL^i$, and Text is an element of N and start-symbol for grammatical derivation of all texts of type Text of the $FNL^i$.

The presented model is universal for all natural languages. All differences between human languages are explained with the variation of the parameters W, N and R.

The expression "type" as used in the present description and claims has to be construed as "a set of expressions or values, in such a way that the members of the same set have common properties according to the definition of said set". A name of a type is always notated as an uninterrupted string beginning with a capital and printed in italics. A name of a function always begins with a lower cast letter.

The Definition of a Word of Type Word

The possibility to define an $FNL^i$ in a purely functional manner depends on the availability of a finite set of invariable, terminal words. These terminal words can serve as arguments for linguistic functions to produce complex expressions.

In the following definitions, the expression "list" is used for "an ordered set of elements of the same type", and the expression "tuple" is used for "an ordered set of elements of arbitrary types". A list is denoted between right brackets [ ] and a tuple is denoted between parentheses ( ).

To define the set W of words of type Word the following definitions are introduced:

a word of type Word:
is an invariable molecule notated as a tuple of one word form of type WordForm and one grammar form of type GrammarForm, such that type Word=(WordForm, GrammarForm)

a word form of type WordForm:
is an invariable string of type String containing at least one character or a selection of characters of type Character from a character alphabet according to current (phonetic, phonological and morphological) rules of the Grammar G of a Formalized Natural Language $FNL^i$, i.e. $G(FNL^i)$, such that type WordForm=String a grammar form of type GrammarForm:
is a selection of grammatical features from a feature-alphabet of the text grammar G of the Formalized Natural Language $FNL^i$, containing a category of type Category and a meaning of type Meaning, such that type GrammarForm=(Category, Meaning)

a category of type Category:
is a code indicating the categorical type of a word, which code is represented as a string of type String of at least one character of type Character, which string refers to a position that the word form of a current word can take up in a syntactical phrase of word forms according to the text grammar of the $FNL^i$, i.e. $G(FNL^i)$, such that type Category=String a meaning of type Meaning:
is a list of features of type Feature for a categorically selected word form, which list of features refers to a choice of grammatical, syntactical conditions tolerating each other during one step in the grammatical process of feature checking, in which process a categorically typed word form of a current word can get a reference to an intended set of manners of being, according to the text grammar of the FNL', such that type Meaning=[Feature].

a feature of type Feature:
is a code of type String, which code refers to a single, determined grammatical condition that can be met by one instance of a set of instances of this condition, according to the text grammar of the $FNL^i$, such that type Feature=String a code of type String
is a list of characters of a character alphabet used in said Formalized Natural Language, such that type String=[Char]

Accordingly, a word of type Word is an invariable molecule of one word form of type WordForm and one grammar form of type GrammarForm, wherein the word form is an invariable string of type String of at least one character of a character alphabet used in the Formalized Natural Language, and wherein the grammar form is a set of grammatical features, which set contains a category of type Category and a meaning of type Meaning, which meaning comprises a list of features in which list every feature is instantiated by one instance of a set of instances of this condition, according to the text grammar of the $FNL^i$.

From the above definitions it can be derived that type Word = (*WordForm, GrammarForm*)

= (String, (Category, Meaning))

= (String, (String, [Feature]))

= (String, (String, [String]))

Example of the English Word-Molecule "Ball" Selected in a Subject Noun Phrase

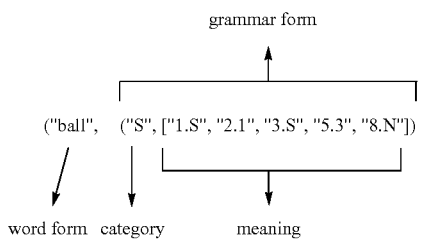

word form   category   meaning

Legend for this Representation of the Word "Ball":

| | | |
|---|---|---|
| S := Substantivum | | |
| 1. = Sub-categorisation, | instantiated as: S | |
| 2. = Casus | instantiated as: 1 or 3 or 4 | |
| 3. = Numerus | instantiated as: S or P or N (= Singul., Plural., or Non-numerable) | |
| 4. = Genus(grammat.) | instantiated as: M or F or N (= Masculine, Feminine or Neutral) | |
| 5. = Persona(grammat.) | instantiated as: 1 or 2 or 3 | |
| 6. = Tempus | instantiated as: T or P (= Present_defaultTempus or Past) | |
| 7. = Definiteness | instantiated as: Y or N (= Yes or No) | |
| 8. = Gender | instantiated as: M or F or N (=Masculine, Feminine or Neutral) | |

Explication:
the word form: "ball" is a symbol composed of alphabetical characters;
the category "S" (=Substantive) specifies the place which the word form can get in a concatenation, according to the production rules of the grammar;
the meaning is a feature-sequence that gives additional information about the necessary syntactical conditions that the context has to realize so that "ball" can get any reference in that context:
"1.S" dictates that the context must tolerate "ball" as a Substantivum-head;
"2.1" dictates that the expression in which "ball" performs must be marked with case1;
"3.S" dictates that the wanted expression must be marked as "Singularis";
"5.3" dictates that the wanted expression must be marked as "persona3";
"8.N" dictates that the gender-context must be marked as neutral;
and the fact that the other possible features 4, 6, and 7 are missing means that the word form "ball" dictates no other conditions but will tolerate all possible conditions dictated by its context with respect to those features.

The Provisional Character of the Defined Grammar Forms

There will be many cases where one word form with one unique grammar form can get anyway different references in different contexts. Take for instance the lemma "ball" with the grammar form [("S", [["1.S","3.S","5.3","8.N"]])] that might be used as a name for the properties:
to be "material-round-object",
or to be "part-of-the-foot",
or to be "social-gathering-for-dancing".

These semantic differences are defined by the contextual semantic conditions of a given expression and the selection of the right reference for the used substantive "ball" has to be the result of an accurate calculation of the total syntactic and semantic context in which the word is used. To make such a calculation possible within the scope of the present invention, it may be desirable to dispose of grammar forms with more features than hitherto have been defined in the given examples. Other features (in a meaning) to define the potential context of a word could be cross-references to
disjunctive sub-categorizations of the type Category,
disjunctive lists of possible synonyms,
disjunctive grades of abstraction,
disjunctive graphs of associative concepts,
disjunctive lists of words with the same "stem",
etc.

But for the understanding of the invention a further discussion of these features and the use thereof is not required and has been omitted here for simplicity's sake.

The Storing of Words in a Lexicon

A word has to go through a complicated selection process in order to perform in a fully-fledged grammatical phrase. In all natural languages it turns out to be possible that one and the same word form wf can satisfy many different grammar forms (gf_1, ..., gf_n), each grammar form typing a different context in which wf can get a reference to an intended phenomenon. For instance:
"ball" as Inflexion (singularis, intrans.), e.g. in the expression: "I/you ball"
"ball" as Inflexion (pluralis, intrans.), e.g. in the expression: "we/you/they ball"
"ball" as Substantivum (case 1/3/4), e.g. in the expression: "the ball"
"ball" as VerbumInfinitum (case 1/3/4), e.g. in the expression: "to ball"

It would be very laborious, memory/space consuming and impractical if one had to store in the Lexicon every word-tuple (wf, gf_1), ... and (wf, gf_n) separately. Therefore the format of a lexical item must be such that it becomes possible to store under one unique word form wf (called the lemma wf) all its possible, disjunctive grammar forms, and every grammar form with all its possible, disjunctive feature sequences (meanings), and every feature with all its possible, disjunctive feature-instances.

The Definition of a Lexicon of Type Lexicon

A lexicon of type Lexicon is a finite list of lexical words of type LexWord, in such a way that each lexical word is constructed as a tuple of one unique word form and a list of disjunctive grammar forms, and each grammar form is constructed as a tuple of a unique category and a list of disjunctive feature sequences called meanings, and every feature is constructed as a string referring to a set of disjunctive instances of a feature. Thus, from the above definitions it can be derived that, in Haskell notation:

$$\begin{aligned} \text{type Lexicon} &= [\textit{LexWord}] \\ &= [(\textit{WordForm}, [(\text{Cateogry}, [\text{Meaning}])])] \\ &= [(\text{String}, [(\text{String}, [[\text{Feature}]])])] \\ &= [(\text{String}, [(\text{String}, [[\text{String}]])])] \end{aligned}$$

This format makes it possible to store all the different words "ball", given above, as one lexical item of type LexWord, in such a way that each lexical word is constructed as a tuple of one unique word form and a list of disjunctive grammar forms, and each grammar form is constructed as a tuple of a unique category and a list of disjunctive feature sequences (meanings), and every feature is constructed as a string referring to a set of disjunctive instances of a feature. For instance:

| | | | |
|---|---|---|---|
| ("ball", | [ ("Ii", | [["1.Ii","3.S","5.12","6.T"], ["1.Ii","3.P","6.T"] | ]) |
| | , ("S", | [["1.S","3.S","5.3","8.N"] | ]) |
| | , ("Vi", | [["1.Vi","3.S","5.3","8.N"] | ]) |
| | ] | | |
| ) | | | |
| | wherein: | | |
| | Ii = InflexionForm_intransitive | | |
| | S = Substantivum | | |
| | Vi = Verbum_intransitive | | |

So, in accordance with the invention, the mentioned format provides a smart manner for storing in a computer the finite set W of molecular words of type Word of a Formalized Natural Language in a lexicon of type Lexicon. In reality a word form as stored in the lexicon with all its possible grammar forms is a very complex bundle of different words of type Word. Which word w of that bundle has to be selected in a concrete grammatical expression must be calculated functionally in the context in which it is syntactically and semantically bound according to its category and its possible feature sequences (meanings).

For clarity purposes, we omit here a more detailed exposition about the whole feature system and the technique to implement it in the Lexicon.

FIG. 1 shows a representation, in accordance with the invention, of a lexical item of the type LexWord as a tree of syntactic symbols. When a word form is to be used (or has been used) in a text, then it can be looked up alphabetically in the lexicon, and its tree can be analyzed systematically in order to select or detect its proper grammar form with its proper meaning needed for a grammatical process.

FIG. 2 shows, in accordance with the invention, an exemplary selection from the Lexicon of FLN$^E$ (English) that can be used to illustrate the production of elements of FLN$^E$. The specification of the grammar form system of one word form wf is the result of an accurate linguistic research.

The Basic Philosophy of Human Language

All human languages are constructed as concatenations of words. So a fundamental question is: what is a word referring to and how to define the semantic reference of a word?

To define the semantics of an FNL$^i$ we assume a Universum Reale, that is the set $U_R$, populated by arbitrarily many concrete and abstract phenomena $P^1, \ldots, P^m$. A concrete phenomenon is a presumed entity E to which different properties are truly assigned, in particular the properties to be determined, to be being and to be E. An abstract phenomenon, also called a property, is a manner of being P by which a set of concrete phenomena that are realizing to be P can be made discernable from all other phenomena that are not realizing to be P. Users of a human language have learned how to communicate about the Universum Reale and its inhabitants.

The basis of all communication is the human capacity to use one constant symbol w (a word form marked with grammatical features) under definite grammatical conditions as a name that refers to a set y of phenomena sharing the same elementary property called "to be w". Property y is recognized by the users of a specific natural language under the grammatically used name w, because they have already many experiences with different phenomena to whom a same property y, called "to be w", has been assigned in their language community.

But there is a fundamental difficulty in defining a property y. We humans cannot even think of one single, abstract property $y^i$ without relating it to other properties $(y^1, \ldots, y^n)$, just as it is impossible for us to think of a property $y^i$ without a realizer of that property or to think of a realizer as having no properties at all. So it is impossible to define one single abstract property $y^i$ without a reference to other properties $(y^1, \ldots, y^n)$.

By consequence, a single word was it has been defined above is nothing more than merely a syntactical, invariable molecule, constructed as a bundle of symbols, without any reference to a property. Words of a natural language can get only a reference to a property when they are brought together in a grammatical composition where they define each other as related names of distinguished and distinguishing properties, according to the grammar rules of the language community.

Therefore, when a word w is used in a grammatical construction we will assume that said word w is transformed axiomatically by a semantic function sem, to be defined below, into the name w referring to a set y of phenomena, which set y is recognized under the name w by the users of FNL$^i$. Thus, for instance: If "famous", "men", "those", "walked" . . . , etc. are selected word forms in a grammatical concatenation, then:

"famous" is the name of the set of all phenomena sharing the property "famous",

"men" is the name of the set of all phenomena sharing the property "men",

"those" is the name of the set of all phenomena sharing the property "those",

"walked" is the name of the set of all phenomena sharing the property "walked",

. . . etc.

Definition of the Semantics of FNL$^i$

Summarizing: a defined FNL$^i$ has a finite set of elementary words w, cleverly stored in the Lexicon of FNL$^i$ with all their possible grammar forms. For a word w@(wf, [[gf]]) in order to get a reference, it is necessary that its word form wf is integrated in a syntactical context, according to the possibilities of its grammar form gf and according to the grammar rules of a particular FNL$^i$, wherein @=alias (in accordance with the Haskell convention).

In other words: in order to get a reference, a word has to be a legal phrase of FNL$^i$. Therefore we have to start with the following definition of an elementary phrase:

If w@(wf, [gf]) is a word that is syntactically selected from the Lexicon of $FNL^i$, then w is an elementary phrase of $FNL^i$.

And now it is postulated that every elementary phrase E gets a semantic value, starting from a valuation (assignment):

sem:: ElementaryPhrase→PropertyName where ElementaryPhrase is the type of all elementary $FNL^i$ phrases and PropertyName is the type of all $FNL^i$ names of properties.

The function sem assigns a semantic value to every elementary phrase w of a $text^n$ of $FNL^i$ in such a way that w refers as a name to a set of phenomena that are said to realize a same property y, called to be w. By consequence the function sem transforms the set W of all grammatically used elementary words of $FNL^i$ in a finite set, called the universum nominate $U_N$, comprehending all elementary names of $FNL^i$.

But since a word can get only a reference as a grammatically generated phrase of an $FNL^i$, and since we defined an $FNL^i$ as an infinite set of functionally generated texts, the function sem induces a function sem* sem*:: Phrase→PropertyName where Phrase is the type of all syntactic phrases of $FNL^i$.

The function sem* assigns a semantic value to every grammatical $text^n$ of $FNL^i$ and to all its sub-phrases including all elementary phrases, such that every phrase x becomes a name P referring to a set of phenomena that are said to be realizing a same property y, called to be P, which name P is interpretable for the users of $FNL^i$ given the proper contextual conditions.

These functions sem and sem* are defined with recursion as follows:

Definition of Sem

Given the use and the grammar of $FNL^i$:

if w@(wf, [gf]) is an elementary phrase of $text^n$, so that wf is a word form and gf is a syntactically selected grammar form (c, [meaning]), then $sem\ w@(wf, [c, [meaning]]) =$ there is a property y, so that y realizes to be $(_c wf_{[meaning]}) \in U_N \Rightarrow$ y realizes to be $(_c wf_{[meaning]}) \Rightarrow y$ is $(_c wf_{[meaning]}) \Rightarrow (_c wf_{[meaning]})$ where the notation in subscript means that the information is hided but derivable in a grammatical context, and where $(_c wf_{[meaning]})$ is the newly generated name for the property y.

Explanation:

The stipulation "y realizes to be $(_c wf_{[meaning]})$" can grammatically be derived in such a way that the provisional name y can be substituted by the linguistic name "$(_c wf_{[meaning]})$".

The definition of sem stipulates for every syntactically used word w of $text^n$ that there is a property y for which a grammatical name $(_c wf_{[meaning]})$ is reserved in $FNL^i$.

With such a name $(_c wf_{[meaning]})$ a set y can be typed comprehending all phenomena that are said realizing to be $(_c wf_{[meaning]})$, including y itself.

"to be $(_c wf_{[meaning]})$" is the verbal, un-applied name for the applied property name "$(_c wf_{[meaning]})$", that is shared by all elements of S, in particular by S itself.

"realizes" in this stipulation is equivalent to "makes true", so that "x realizes to be $(_c wf_{[meaning]})$" is equivalent to "x makes true to be what $(_c wf_{[meaning]})$ denotes".

An elementary property-set y called does not need a specific definition because the said set is specified ipso facto, given the language $FNL^i$. Property-set $(_c wf_{[meaning]})$ is defined and legalized by the totality of all the possible relations it has with all other elementary property-sets named in $FNL^i$.

Definition of Sem*

1. If word w is a legal elementary phrase of $FNL^i$, then sem* w@(wf, [(c, [meaning])])=sem w@(wf, [(c, [meaning])])
2. If $(_{XP} (x^1 \ldots x^j)_{[meaning]})$ is a legal, complex X-Phrase of $FNL^i$, where $(x^1 \ldots x^j)$ is the concatenation of the word forms of the hierarchically composed sub-phrases (A, ..., Z) and [meaning] contains the unified feature-sequence of the meanings of the sub-phrases (A, ..., Z), then the function sem* transforms $(_{XP} (x^1 \ldots x^j)_{[meaning]})$ in the name of a set S so that for every phenomenon P that is an element of said set with said name can be said according to the author of $text^n$: P realizes to be ((sem* A), ..., (sem* Z)), where every syntactically determined name, which is constructed with a determiner, in particular can be marked with a unique index h, because said determined name is referring to a singleton set comprehending a phenomenon of which the unique identity h can be distinguished and recognized and determined in a given context with the aid of the properties inductively named in the name of said singleton set.

Explanation:

It should be realized that there is a great difference between:
1. an invariable word of type Word, which is a purely syntactical molecule without any reference, to be used as an argument for a linguistic function,
2. a lexical item of type LexWord, which is actually a cleverly stored bundle of one or more words of type Word, and
3. a word that is used as a phrase in a grammatical $text^n$ and that has a semantic value thanks to the functions sem and sem*.

The definition of the functions sem and sem* are inductive not only because they use recursively these defined functions, but also because they use other defining words that have to be defined by sem and sem*.

The functions sem and sem* relate the meta-language to the language $FNL^i$ and relate at the same time the $U_R$ to the $U_N$.

It is important to realize that it is not necessary to calculate these semantic functions apart from the syntactic production of a grammatical text. These functions are applied automatically from the beginning of the production of a grammatical text, since they have been defined inductively in accordance with the inductive syntax of the grammar of FNL'. So a grammatical text is ipso facto a semantic text.

The Reference of Complex Expressions

The function sem* projects a set of syntactic phrases to a set of grammatical names, each name referring to a set of phenomena presumed to realize to be the property called with said name, such that said function sem* reveals an assumed set called Universum Reale comprehending concrete and abstract phenomena to which users of $FNL^i$ may refer with grammatical names, each name being an element of a sub-set of the power-set of the Universum Nominale of $FNL^i$.

Since an $FNL^i$ has been defined as an infinite set of texts of type Text we assume that phrases can be transformed in names only within the framework of a concrete syntactic text which has to be inductively derived starting with the start-symbol Text. The set of all names generated in a $text^n$ is called the hierarchically ordered set $D_N{}''$=Domanium Nominale of text$''$. That is: text$''$=$D_N{}''$. Thus, the set $D_N{}''$ of text$''$ comprehends:

a subset A of different elementary set names w (wherein $A \subset U_N$) and a subset B of complex names, where every complex name is grammatically constructed with elements of A, such that $$D_N{}'' = (A \cup (B \subset \wp(A)) \subset \wp(U_N)$$

wherein $\wp$ =the power set of $\cup$=the union of $\subset$ =a proper sub-set of.

The Visual Representation of the Real Domain of Text$''$

If a text$''$ can formally be analyzed as a set of linearly and hierarchically interrelated sub-texts where every text is a determined name of a determined phenomenon, where every text sentence can be interpreted as compositionally constructed with sub-names of interrelated sub-sets, then it is possible to give a visible representation of a text$''$ in the shape of a sequence of interrelated Venn diagrams.

Venn diagrams are illustrations used in the branch of mathematics known as set theory. A Venn diagram shows the possible mathematical and logical relationships between sets represented as interrelated circles and ellipses, in our case: illustrations of phenomena sharing a same named property. A Venn diagram of a text$''$ has to be a linear sequence of hierarchically ordered sub-diagrams, one diagram for every successive sentence of text$''$, in such a way that every diagram comprehends all the inter-related sets that are named in the current sentence, every set comprehending phenomena realizing the property called in the set's name, where every determined complex phrase in particular is made visual as an indexed singleton set comprehending a phenomenon of which the identity can be distinguished and recognized by the properties named in the names of the cross sections of said singleton set according to the grammar of said Formalized Natural Language.

The Formal Account of the Reference of a Text

There is no need to calculate the reference of each textual expression XP apart from its syntactic construction. In fact, if $FNL^i$ is implemented in a purely functional computer-language (for example in Haskell), then the syntactic and the semantic functions of text processing are mixed with each other from the very beginning.

One word form wf of type WordForm as stored in the Lexicon of an $FNL^i$ can have different disjunctive meanings, ordered in a lexical item of type LexWord. But word forms that are syntactically combined in expressions are restricting each other's possible meanings by a syntactic production process in three steps, i.e. first by a process of categorical concatenation, secondly by a process of feature-unification and at last by a process of indexation, as will be explained later. We can therefore state simply that if an expression of a type XP has been grammatically and hierarchically composed, then that expression is the name of a phenomenon with index j that is identifiable and discernable by its attributed properties, denoted by the property-names that can come through the straining process of the categorical selection, the feature-unification and the indexation of the phrases composing its name.

So a phenomenon $j(\in D_R{}'' \subset U_R)$ denoted in a given text$''$ is grammatically defined by naming some of the properties ("manners of being") by which j can unambiguously be discerned from the other phenomena within the text-domain $D_R{}''$.

We specify formally: If a communicating person (to be called: the sender or the author) will indicate an identified phenomenon j in text$''$ (here after expressed as Identity j, where $j \in D_R{}''$, $D_R{}'' \subset U_R$), then he must choose an appropriate element $P \in D_N{}''$, where P is a grammatical name for Identity j. This can be done in the following way:

The sender has to select a choice of elementary and complex manners of being $\{z^1, \ldots, z^k\} \subset U_R$ by which Identity j is identifiable. This finite set $\{z^1, \ldots, z^k\}$ is the real text-domain $D_R{}'' \subset U_R$.

The sender has to create inductively the grammatical names for the elementary and complex manners of being $\{z^1, \ldots, z^k\}$ with the functions sem en sem*, so that the finite set of names $\{(\text{sem}^* z^1), \ldots, (\text{sem}^* z^k)\}$ is the nominal text-domain $D_N{}'' \subset \wp(U_N)$.

The intended name P is found by the sender with the aid of the function $\phi$:

$$\phi :: D_R{}'' \to D_N{}''$$

Let: $P=\phi(j)$, where j is the unique index of the intended Identity $j \in D_R{}''$, then the sender is expecting that there is an inverse function:

$$\phi^{-1} :: D_N{}'' \to D_R{}''$$

in such a way that an other person, (the receiver) receiving P, is able to find Identity j in $D_R{}''$ with:

$$j = \phi^{-1}(P)$$

When this communication works well, then $\phi$ is a bijection between $D_R{}''$ and $D_N{}''$.

Speaking the Truth

The reason of speaking about phenomena instead of entities is to avoid the impression that one is infallibly able to indicate entities in a text. When speaking about an entity then it should be realized that in fact nothing more is done than applying the property "to be entity" to a presumed bundle of other properties. All our speaking is nothing more than an attempt to put in words by what properties phenomena clarify themselves to us, that is to say by what properties they resemble other phenomena and differ from other phenomena at the same time. If we want to speak about "entities" then expressing their "manner of being" in words is a matter of expressing the truth or the false. And finding the truth is always a matter of scientific testing whether an "assumed" phenomenon realizes indeed the property names applied to it or whether it is nothing more than an empty, invented construction of property names, something like "a square circle".

Truth is the case when an "assumed" phenomenon proves to realize all the manners of being indicated in its name. And when truth is the case, then we assume that the $D_N{}''$ of a text$''$ is referring to a proper subset of $U_R$, which subset can be called the Domanium Reale $D_R{}''$ of text$''$. Otherwise a pretended text$''$ is nothing more then an error, i.e. only a picture build with pseudo property names but without any reference to a phenomenon of $U_R$ realizing indeed the named properties.

It has to be established here that a linguistic name always remains an hypothetic concept because the basis of such a name is the assumption that the users of a natural language using elementary property names have in their minds the same sets of phenomena realizing the named properties! Sensible human beings know very well, that this assumption still has regularly to be proved as being true and never has been proved for eternity! Therefore, "a linguistic name" can be used as synonymous with "a hypothetic concept" or shortly "a hypothesis".

In the next pages it will be demonstrated how a text$''$ of $FNL^i$ can functionally be generated or parsed.

The Production of Complex Expressions in Three Steps

As not all phenomena of $U_R$ share the same properties at the same time, and as every phenomenon always shares many properties at the same time, human beings must use many different elementary phrases, to construct grammatically complex phrases to be used as complex property names for the complex phenomena about which they want to communicate. So it has to be explained how complex syntactic phrases can inductively be constructed with elementary phrases in accordance with the grammar rules of $FNL^i$.

Since we defined a text as the unit of language use it has to be demonstrated how a legally derived text of type Text can be conceived of as a complex phrase inductively composed of sub-phrases, where every sub-phrase is ultimately composed of elementary phrases, and where an elementary phrase is an invariable word syntactically selected from the lexicon of $FNL^i$.

The text grammar $G(FNL^i)$ disposes of a set of grammar rules to generate the complete and correct set of text-phrases. Every sub-phrase of a text has to be produced in accordance with a set of production rules that has to be complemented by a set of feature checking rules and a set of index checking rules. So a totally correct phrase xp of any type XP has to be generated in three steps:

step 1: a function xp has to produce first the successive concatenation of the selected argument phrases, using the production rules and the category of the selected argument phrases as norm;

step 2: Since a categorical concatenation of phrases can only become a legal expression on the condition that the features of the composing arguments are unifiable, according to a given set of unification-rules, the function xp must also control the feature-sequences of the concatenated arguments in order to legalize their unification by finding the greatest common divisor of their feature-sequences;

step 3: Since a syntactical concatenation with unified features can only become a referential expression on the condition that every phrase is a name referring consistently to an identified phenomenon in the real domain $D_R{}''$ of $text''$, the function xp must also control whether the indexing rules have been properly applied.

We will skip in this paper the detailed description of these grammar rules for the unification and the indexation of phrases. We will restrict ourselves to the global demonstration of some examples.

The Context-Free Production Rules

The recursive, context-free production rules take the general form:

$$XP \rightarrow UP \ldots ZP,$$

XP is a category-type of a phrase to be generated by a function xp taking respectively as arguments an element of types UP, ..., ZP. The result of the function xp is of type (String, (XP, [Meaning])), wherein String represents the type of a concatenation of the word forms of the selected elements of the respective types UP, ..., ZP and wherein Meaning represents a type of a result of grammatical rules for unification of meanings of the selected elements of type UP, ..., ZP, according to the grammar of the $FNL^i$.

A defined $FNL^i$ is an infinite set of all and only syntactical phrases of type Text, wherein a text of type Text is a recursive function of a modal sentence of type ModalSentence and a dependent list of type Text, according to the text grammar of the $FNL^i$. Therefore the generation of an element of $FNL^i$ always begins with the recursive production rule of the start symbol Text:

$$Text \rightarrow ModalSentence[Text]$$

This rule can be read as: an element of type Text can be produced as an element of type ModalSentence followed by a possibly empty list of type Text.

However, such a production rule in general can also be interpreted in the following way: If X is the left-hand side of a grammatical production rule of $FNL^i$, then there is a function x that asks for the argument(s) of the type(s) on the right-hand side of the production rule in order to produce a categorically legalized concatenation of type X.

In casu: Text is the left hand-side of a production rule, so there is a function text requiring two arguments, one of type ModalSentence and one of type [Text], in order to produce a concrete element of type Text. This function text can be expressed in Haskell as:

$$text :: ModalSentence \rightarrow [Text] \rightarrow Text$$

The Production of Modal Sentences

The second production rule must stipulate how a modal sentence can be derived. All natural languages have many kinds of modal sentences, for instance indicatives, questions, imperatives, wishes, dependent sentences and other modalities. Therefore it is necessary that for every kind of modality a specific constructor is defined so that it is clear how the argument phrases selected for a modal sentence function have to be arranged in a concrete modal sentence. This means that an element of type ModalSentence can be derived via a Constructor in an unevaluated abstract sentence of type AbstractSentence followed by an evaluated concrete sentence of type ConcreteSentence. In other words: the abstract sentence is the deep structure of the concrete sentence. So the second production rule sounds:

$$ModalSentence \rightarrow AbstractSentence\ ConcreteSentence$$

Argument phrases that must be selected for a modalSentence function are respectively of types Integer, Topic, Subject, InflexionData and DictumPredicativum, represented in a shorter way as:

$$type\ AbstractSentence=(Int, Topic, Subj1, IData, DctPr)$$

Explanation:

Int: is the type of the number n (n>0, beginning with 1) of a modal sentence in the linear order of a $text''$.

Topic: is the type of a determined phrase that serves as a logical head accounting for the hierarchical place of the current modal sentence in its context. A topic is a determined phrase, performing as a second element of an abstract sentence heading a text T, such that the topic acts as a title of text T and has to perform explicitly in at least one concrete modal sentence of text T, and such that every topic of a dependent abstract sentence of text T must be borrowed from a previous modal sentence of text T;

Subj1: Subject is the type of the noun phrase with casus 1 to which the dctPr is applied. A subject of type Subj1 is a function of a determined phrase to which phrase the dictum predicativum has to be modally applied by the current function text;

IData: is the type of the sequence of strings, representing the data that are needed to apply modally the dctPr to the subj1. For English these data are: possibly an auxiliary verb and always a tempus ("T"=(default) Presens, or "P"=Past).

DctPr: is the type of a definitely determined verb phrase completed with its objects and adjuncts, in such a way that these objects and adjuncts are ordered as they have to be modally applied by the function text on the current subject of type Subj1. The transformation of the determined verb phrase into a proper inflexion form and the ordering of objects and adjuncts in order to generate a concrete modal sentence is functionally regulated by grammar rules dependent on the modal constructor and the given Idata.

A constructor plus an element of type AbstractSentence is in fact a kind of a "restrained" modal sentence function, i.e. it represents all the unevaluated argument data that are needed for the current function text to produce a concrete modal sentence. Such a restrained function can be represented in the format of a Haskell data type, i.e. a set of similar tree-structures each of them initiated by a constructor-name indicating the kind of concrete sentence that has to be formed with arguments given in an abstract sentence.

So the data type ModalSentence is defined as:

| data type | Constr. | tuple of argument-types |
|---|---|---|
| data ModalSentence = | Ind | AbstractSentence |
| \| | Qst | AbstractSentence |
| \| | Com | AbstractSentence |
| \| | IndInv | AbstractSentence |
| \| | ComInv | AbstractSentence |
| \| | DepS | AbstractSentence |
| \| | ... | | wherein:
| = or
Ind = Indicative constructor
Qst = Interrogative (questioning) constructor
Com = Imperative (commanding) constructor
IndInv = Indicative_Inverted constructor
ComInv = Imperative_Inverted constructor
DepS = DependentSentence constructor
... = other constructors are possible Now a further, provisory choice of context-free production rules will be given in order to derive a simple example text in $FNL^E$.

Many more sophisticated production rules can be formulated. But it is impossible to give a full-scale description of the grammar of $FNL^E$ here. We want to limit our description to an exemplary, global derivation of some concrete elements of $FNL^E$, without going into all the grammatical details. Like the specification of the Lexicon, also the specification of the production rules (with unification rules and indexing rules) of an $FNL^i$ is actually the result of accurate linguistic research (which we assume here as given).

The Formal Derivation of a Function

Context-free derivation steps can be formally described as follows:

Suppose $X \rightarrow \beta$ is a production of an $FNL^i$-grammar, where X is a non-terminal symbol and $\beta$ is a sequence of non-terminal or terminal symbols. Let $\alpha X \gamma$ be a sequence of non-terminal or terminal symbols. We say that $\alpha X \gamma$ directly derives the sequence $\alpha \beta \gamma$ that is obtained by replacing the left hand side X of the production by the corresponding right hand side $\beta$. We write $\alpha X \gamma => \alpha \beta \gamma$ and we also say that $\alpha X \gamma$ rewrites to $\alpha \beta \gamma$ in one step. A sequence $\phi_n$ is derived from a sequence $\phi_1$, written $\phi_1 =>^* \phi_n$, if there exist sequences $\phi_1, \ldots, \phi_n$ with $n \geq 1$ such that For all i, $1 \leq i < n : \phi_i => \phi_{i+1}$ If n=1 this statement is trivially true, and it follows that we can derive each expression from itself in zero steps:

$\phi =>^* \phi$

Finding a derivation $\phi_i =>^* \phi_n$ is in general a non-trivial task. A derivation is only one branch of a whole search tree,

| | Production rules | Clarifications |
|---|---|---|
| Topic | → DP | DeterminedPhrase |
| IData | → (Aux$^?$, Tempus) | Auxiliary ($^?$ = zero or one) |
| Tempus | → T \| P | T = Presens(default), P = Past |
| Subj1 | → DP | Subject-with-case1, DeterminedPhrase |
| Obj3 | → DP | Object-with-case3 |
| Obj4 | → DP | Object-with-case4 |
| DP | → DNP \| DctPr | DeterminedNounPhrase, DictumPredicativum |
| \| Pr | | PronomenPersonale |
| DNP | → DrP ATNP | DeterminerPrase, AttributiveNounPhrase |
| DctPr | → DVP AVP$^?$ Adjunct* | DeterminedVerbPhrase, AdverbPhrase |
| DVP | → DrP ATVP | AttributiveVerbPhrase |
| DrP | → Dn \| Dv | Determiner-nominal, Determiner-verbal |
| ATNP | → CP$^?$ AJP* N PP | CountingPhrase, AdjectivalPhrase (* = zero or more), Noun, PrepositionPhrase |
| ATVP | → VC Rest$^?$ | VerbalConstituent |
| VC | → Vi \| Vt Obj4$^?$ \| "be" \| ... | VerbumIntransitivum., VerbumTransitivum |
| AVP | → Av* | Adverb |
| AJP | → AVP Aj \| AVP Prt | Adjective, Participium |
| Adjnct | → PP | PrepositionalPhrase |
| PP | → P Obj3 | Preposition |
| N | → S \| Nm | Substantive, Nomen |
| Dn | → Dm \| Pos | Demonstrativum, Possessivum |
| Dm | → Dmw \| Dmn \| Dmf | Demonstrativum weak/near/far |
| Dmw | → "the" \| "a(n)" \| ... | (see Lexicon) |
| Dmn | → "this" \| "these" \| ... | (see Lexicon) |
| Dmf | → "that" \| "those" \| ... | (see Lexicon) |
| Pos | → "his" \| "her" \| ... | (see Lexicon) |
| Dv | → "to" | (see Lexicon) |
| S | → "examination" \| "girl" \| ... | (see Lexicon) |
| Nm | → "John" \| ... | (see Lexicon) |
| Pr | → "he" \| ... | (see Lexicon) |
| Vt | → "pass" \| ... | (see Lexicon) |
| Av | → "very" \| ... | (see Lexicon) |
| Aj | → "nice" \| "old" \| ... | (see Lexicon) |
| ... etc. | | | which contains many more branches. Each branch represents a (successful or unsuccessful) direction in which a possible derivation may proceed.

Note that different grammars may have the same language. Two grammars that generate the same language L are called equivalent. So for a particular grammar there exists a unique language L, but the reverse is not true: given a language L we can usually construct many grammars that generate the language L. Mathematically speaking: the mapping between a grammar and its language is not a bijection.

A partial derivation is a derivation that still contains non-terminals in its right hand side. There may be several productions of the grammar that can be used to proceed a partial derivation with, and as a consequence there may be different derivations for the same expression. There are two reasons why derivations for a specific expression can differ:
1. Only the order in which the derivation steps are chosen differs. All such derivations are considered to be equivalent.
2. Different derivation steps have been chosen. Such derivations are considered to be different.

The set of all equivalent derivations can be represented by selecting a so-called canonical element. A good candidate for such a canonical element is the leftmost derivation. In a leftmost derivation, only the leftmost non-terminal is rewritten. If there exists a derivation of a text x using the productions of a grammar, then there exists a leftmost derivation of x.

There is another convenient way for representing equivalent derivations: they all have the same parse tree (or derivation tree). A parse tree is a representation of a derivation that abstracts from the order in which derivation steps are chosen. The internal nodes of a parse tree are labelled with a non-terminal N, and the children of such a node are the parse trees for symbols of the right hand side of a production for N. The parse tree of a terminal symbol is a leaf labelled with an item of type Word.

The Exemplary Production of a Concrete Expression

Given the exemplary Lexicon in FIG. 2 and the categorical production rules of $FNL^E$ (E=English) it is possible to produce the set of all elements of any categorical type X of $FNL^E$ in three steps as indicated above. Let us produce, as an example, the determined noun phrase "that very nice girl", being a dnp function of text", with the production rules given above:

Step 1:
According to the Production-Rules:
in order to form a DNP a function dnp is required that asks for a DrP and an ATNP as the head of the DNP, where a head of an expression is the constituent that determines the properties of the expression as a whole;
in order to form a DrP a function drp is required that asks for a Dn (in casu: a Dmf) as a determiner for an ATNP;
in order to form an ATNP a function atnp is required that asks for an optional AJP, a Noun as a head and zero or more PP's;
in order to form an AJP a function ajp is required that asks for an optional AVP and a lexical head of category Aj;
in order to form an AVP one or more lexical elements of category Av are required.

Accordingly, the following function dnp can be formed using the proper selection of word forms from the Lexicon with the fitting, categorically typed grammar forms:

| dnp | (drp ("that", [("Dmf", [["3.S","5.3","7.Y"]])] ) ) | "that" = drp-head |
| | (atnp (ajp (avp ("very", [("Av", [[ ]])]) ) | |
| | ("nice", [("Aj", [[ ]])]) ) | "nice" = ajp-head |
| | ("girl", ("S", [["1.S","3.S","5.3","8.F"]]) ) ) | "girl" = atnp-head |
| | ) | |

First this function will be re-written such that all the terminal word forms are given in normal script and all their features in subscript:

| dnp | (drp ($_{Dmf}$"that"$_{[["3.S","5.3","7.Y"]]}$) ) |
| | (atnp (ajp (avp ($_{Av}$ "very"$_{[[ ]]}$) |
| | ($_{Aj}$ "nice"$_{[[ ]]}$) ) |
| | ($_S$ "girl"$_{[["1.S","3.S","5.3","8.F"]]}$) |
| | ) |

Step 2: The Feature Checking

Now there must be checked whether the features of the selected phrases of one production rule XP can be unified. This process is called "the unification of the features of the concatenated phrases", i.e. the process of finding "the greatest common divider" of the feature sequences of hierarchically ordered phrases, according to the grammar $G(FNL^E)$.

Then first a DRP and an AVP can be derived:

| (drp ($_{Dmf}$"that"$_{[["3.S","5.3","7.Y"]]}$)) | (only a head, that does not need unification) |
| => ($_{DRP}$ "that"$_{[["3.S","5.3","7.Y"]]}$) | |
| (avp ($_{Av}$ "very"$_{[[ ]]}$)) | (likewise) |
| => ($_{AVP}$ "very"$_{[[ ]]}$) | |

Thus, substituting these results in the original function, one gets:

| dnp | ($_{DRP}$ "that"$_{[["3.S","5.3","7.Y"]]}$) |
| | (atnp (ajp ($_{AVP}$ "very"$_{[[ ]]}$) |
| | ($_{Aj}$ "nice"$_{[[ ]]}$)) |
| | ($_S$ "girl"$_{[["1.S","3.S","5.3","8.F"]]}$) |
| | ) |

Now the features of the arguments of ajp (where "nice" is a head and "very" is an attribute) can be unified, so that one gets:

| => dnp | ($_{DRP}$"that"$_{[["3.S","5.3","7.Y"]]}$) | |
| | (atnp ($_{AJP}$"very nice"$_{[[ ]]}$) | (the atnp-attribute) |
| | ($_S$"girl"$_{[["1.S","3.S","5.3","8.F"]]}$) | (the atnp-head) |
| | ) | |

Now the two arguments of the function atnp can be unified, because all the features of "girl" can be shared by the empty feature-sequence of the AJP-concatenation, so that one gets:

| => dnp | ($_{DRP}$"that"$_{[["3.S","5.3","7.F"]]}$) | (the dnp-attribute) |
|---|---|---|
|  | ($_{ATNP}$"very nice girl"$_{[["1.S","3.S","8.F"]]}$) | (the dnp-head) |

The features of "that" and of the newly formed ATNP-head-expression go very well together, thus the function dnp can generate the desired syntactical expression of category DNP with the unified features (head substantive, singularis, persona3, definabilityYes, genderFeminine):

| => | ($_{DNP}$ "that very nice girl" $_{[["1.S","3.S","5.3","8.F"]]}$) |
|---|---|

As a Counter-Example:

Assume that one chooses the word forms ("that", "very", "nice", "girls") with their respective grammar forms for a desired dnp production. With this selection one can easily form the concatenation "that very nice girls" which is categorically legal according to the given production rules! But it cannot become a syntactical expression because the features of "that" (with "3.S"=singularis) and "girls" (with "3.P"=pluralis) cannot be unified.

Step 3: The Semantic Index Checking

In order to make sure that all syntactic phrases within one text[n] can be understood as names consistently referring to a determined phenomenon in the real domain $D_R^n$, there is a grammatical set of indexing rules regulating that a new name for a newly presented phenomenon must get a new index, and that a new name for an already identified, indexed phenomenon must get the same already existing index. This set of indexing rules, practised by the users of $FNL^E$, is not mentioned here explicitly.

After the categorical concatenation, the feature checking and the index checking, it is postulated that the functions sem and sem* (both already defined above) assign inductively a name-value of a determined "manner of being" (property) to all valid expressions, in order to define the reference of all the generated grammatical phrases, according to the grammar of $FNL^E$.

An Example Text Tree

Figure 3:
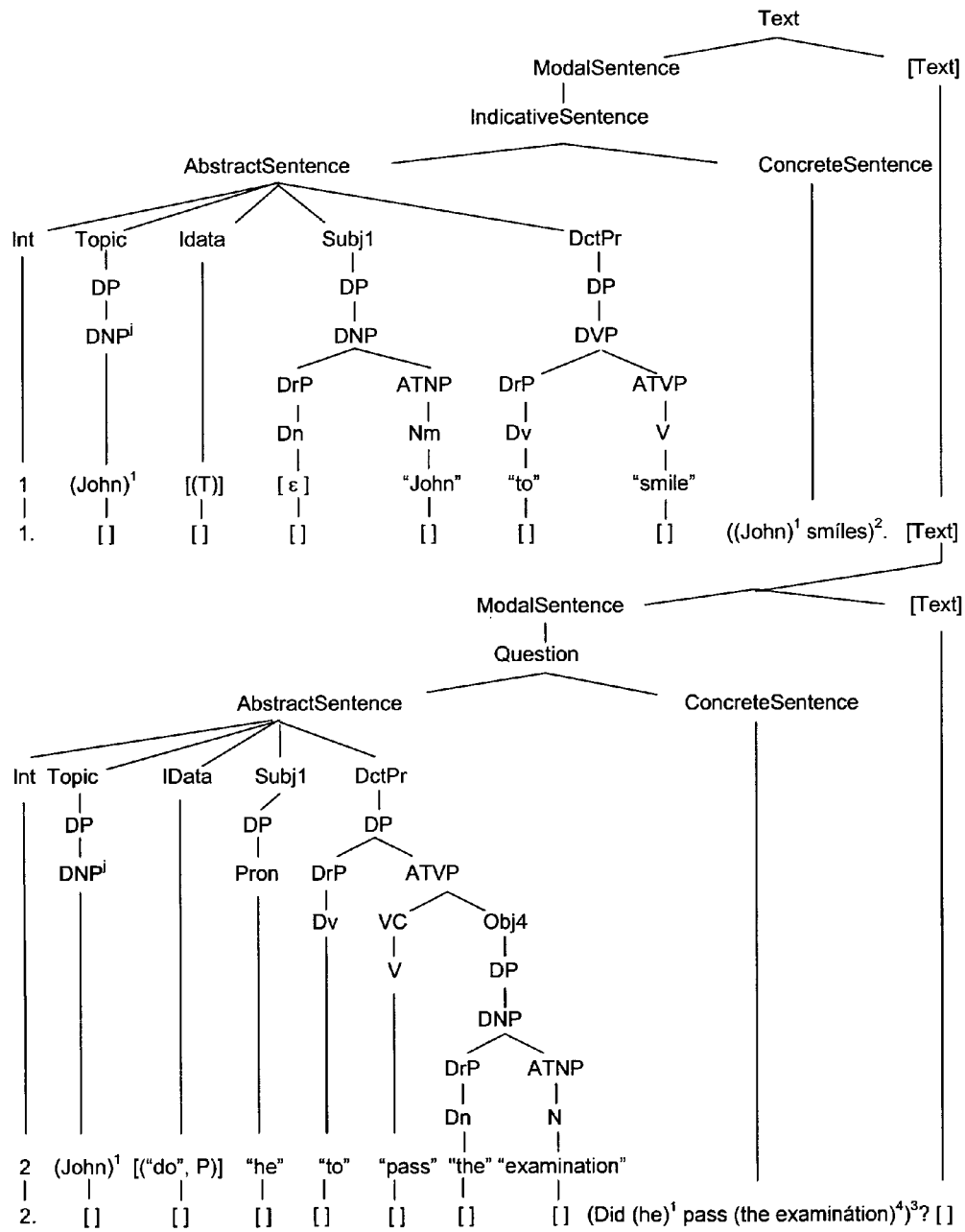
FIG. 3 shows, in an illustrative configuration, a gramprint of an example text″, in accordance with the present invention.

We will give in FIG. 3 the parse tree of the text: "John smiles. Did he pass the examinátion?" That parse tree is simplified by omitting all the necessary unified features. For this moment it will do to show how the function Text generates recursively (using other functions as arguments) a concrete modal sentence followed by a list of dependent texts.

Be Given the Text:

"John smiles. Did he pass the examinátion?"

The parsing of this text can be represented in a linear bracket structure as:

1. ((John)[1] smiles)[2]. [2. (Did (he)[1] pass (the examinátion)[4])[3]? [ ]]

The parse-tree of this text is represented as given in FIG. 3.

Explanation of the Example Tree of FIG. 3:

An abstract sentence is a representation of the "deep structure" of a concrete sentence. In an abstract sentence tree all the (non-terminal) arguments are given that are required for the functional production of the terminal concrete modal sentence that is represented as a leaf on its own.

The concrete modal sentence (including the inflexion form and the word order) is the evaluation of the function text using the data of the abstract sentence as its arguments, according to the current Constructor.

In the abstract sentence tree the non-terminal topic ($_{DNP}$ "John")[1] represents a con-textually given, already indexed definitely determined name chosen by the text-author as the already known and indexed topic of the current text.

On the other hand, the nomen "John" in the subj1-tree is the lexical syntactic symbol, chosen as a dnp head by the text-author in order to generate the terminal, definite subject-name of the concrete modal sentence, to which the property name of type DictumPredicativum has to be assigned.

There is a rule stating that a definitely determined dnp composed with a nomen does not need explicitly a definite determiner; so the DrP of ($_{DNP}$ "John") is empty.

The quotes of a non-terminal leaf of an abstract sentence express that this leaf is in fact a sequence of characters. We use the convention that the real terminal leaf (a concrete sentence) is represented without quotes, although it is also a sequence of characters.

A referential pronoun like "he" in the second text sentence complies with (here not explicated) grammatical rules by which its referee 1 can be found.

A terminal text[n] is semantically the name of a real text domain $D_R^n$, structured as a sequence of hierarchically ordered sub-domains. The real text domain $D_R^n$ can be represented as "a sequence of one or more modally and temporally determined, random pictures of inter-related phenomena". The $D_R^n$ of this example text can be explicated informally as follows:

There is a first text domain comprehending phenomenon 1 (realizing to be the definitely determined "John"), where phenomenon 1 realizes the definitely determined phenomenon 2, i.e. the property "to smile", modally applied to phenomenon 1 as an indicative in the present tense.

And there is a second, dependent text domain, wherein the question is asked with respect to the said phenomenon 1, denoted by "he", whether he realized in the past tense the definitely determined phenomenon 4, i.e. the definitely determined property "to pass", where the passed object realizes to be the definitely determined phenomenon 3, i.e. "the (=definitely determined) examination".

The Visual Representation of the Real Domain of Text[n]

It has been demonstrated above how, according to the present invention, a text[n] can be represented as a gramprint, i.e. as a set $D_N^n$ of hierarchically ordered names referring to a set $D_R^n$ of phenomena, where $D_R^n$ is a sub-set of the Universum Reale.

According to our hypothesis a text[n] is a linear sequence of hierarchically interrelated sub-texts, where every text sentence is the determined name of a phenomenon x, where this name can be interpreted as compositionally constructed with sub-names of sets comprehending phenomena that share a same property y denoted by an inductively formed property name, according to the basic philosophy of human language. Therefore it is possible to give a representation of the real domain $D_R^n$ of a text[n] in the shape of a sequence of interrelated Venn diagrams.

Venn diagrams are illustrations used in the branch of mathematics known as set theory. A Venn diagram gives a visual representation of the relations between the sub-sets of a set.

A Venn diagram of a text[n] has to be a linear sequence of hierarchically ordered sub-diagrams, one diagram for every successive head sentence of text[n], in such a way that every diagram comprehends all the inter-related property sets that are named in the current head sentence, according to the defined semantics of $FNL^E$.

A Venn diagram of a sub-text, in an embodiment of the invention, represents sets of phenomena as circles and ellipses, possibly making cross-sections with each other, where for the purpose of the invention the following conventions have to be obeyed:
- the representation of a set of phenomena is as general as possible with respect to what is known about the said set according to its grammatical name;
- specific set-information is given by labels in the representation
- sets that are denominated with a syntactically determined name are marked by an identifying index j referring to an intended identified named phenomenon j.

The Sequence of Venn Diagrams of the Example Text".

FIG. 4 shows, in an illustrative configuration, a sequence of hierarchically ordered Venn-diagrams of the example text in FIG. 3, in accordance with the present invention. Be given the parsed text:

1. ((John)$^1$ smiles)$^2$. [2. (Did (he)$^1$ pass (the examinátion)$^4$)$^3$? [ ]]

This text" contains a sequence of two hierarchically ordered sub-texts, where every sub-text can be represented as a random picture of all named, interrelated property-sets at a given moment: See FIG. 4.

Explanation of the Venn Diagrams of FIG. 4:

1. The first picture of this text shows the following sets as a proposed hypothesis:
   - The set "John" comprehending in general all sub-sets $x^i$ comprehending all phenomena to whom the property "to be John" has been assigned; in particular the set $x^1$ and the set "John" itself.
   - The set $x^1$ comprehending phenomenon 1 to whom the property "to be definitely determined" (only partly represented) and the property "to be John" have been assigned.
   - The set "smile" comprehending in general all sub-sets $y^i$ to whom the property "to be smile" has been assigned, in particular the set $y^2$ and the set "smile" itself.
   - The set $y^2$ comprehending phenomenon 2 to whom the property "to be definitely determined" (only partly represented) and the property "to be smile" has been assigned.
   - In particular the singleton set $(x^1 \cap y^2)$ to whom first the property "to be the definitely determined John" in a durative sense has been assigned, and secondly the definitely determined property "to smile" has been assigned in the present tense. The phenomenon represented by this singleton set $(x^1 \cap y^2)$ realizes many other, unnamed properties, but this set is unambiguously recognizable because it comprehends the only phenomenon in the given domain of this text that is realizing its own set of properties and in particular the properties named in its name.
   - For all sets that are labelled with an indexing integer and for all sets that are labelled with a lexical property name can be said that they are cross-sections with the sets "to", "be" and "determined".

2. The second picture of this text shows the following sets as a hypothesis proposed as a question:
   - The set "John" comprehending in general all sub-sets $x^i$ comprehending all phenomena to whom the property "to be John" has been assigned, in particular the set $x^1$ and the set "John" itself.
   - The set $x^1$ (denoted by "he" which refers to John$^1$) comprehending phenomenon 1 to whom the property "to be definitely determined" (only partly represented) and the property "to be John" have been assigned.
   - The set "pass" comprehending in general all elements $v^i$ to whom the property "to be pass" has been assigned, in particular the set $v^3$ and the set "pass" itself, where the chosen object of "pass" is represented by the set $z^4$.
   - The set "examination" comprehending in general all sub-sets $z^i$ to whom the property "to be examination" has been assigned, in particular the set $z^4$ and the set "examination" itself.
   - The set $z^4$ comprehending phenomenon 4 to whom the property "to be definitely determined" (only partly represented) and the property "to be examination" have been assigned.
   - In particular the set $(x^1 \cap v^3)$ comprehending phenomenon 1 to whom first the property "to be the definitely determined he$^1$" has been assigned in a durative present sense, and secondly the definitely determined property "to pass object $Z^4$" has been assigned in the present tense. The phenomenon represented by this singleton set $(x^1 \cap^3)$ realizes many other, unnamed properties, but this set is unambiguously recognizable because it comprehends the only phenomenon in the given domain of this text that is realizing its own set of properties and in particular the properties named in its name.

An FNL$^i$ as a Digitization of Human Knowledge

According to the theory presented here, a specific formalized human language is an infinite set of texts and a specific text" is a name for a hypothesis T that refers to a complex set S of interrelated phenomena where S is a subset of the Universum Reale, in such a way that these phenomena in S can be unambiguously distinguished and recognized by the properties named in their respective names. The fact that the syntactic-semantic structure of such a hypothesis T about a subset S of the universe can be inductively produced in a purely functional way implies that such a hypothesis T also can be digitized, i.e. arithmetically processed. So our language faculty can do what our arithmetic faculty is able to do, i.e. to calculate and represent unambiguously the meaning of an expression.

A digitization D of an FNL$^i$-text T is performed in a computer equipped with an FNL$^i$ grammar by reading T and by computing the syntactic-semantic value n of T at every successive completion of a phrase, where every calculated value n can be represented by a complex sequence of digits, because the invariable syntactic-semantic information of every elementary word can be expressed as a unique ordered set of digits, and because every completed complex expression is a compositional function of the concatenated elements. So a digitization D of a text T about a phenomenon P is in fact the functional calculation of the manner of being by which P is discernable and identifiable in its context.

As will be appreciated from the above, for a human being it is quickly impossible to calculate exactly by mental arithmetic the syntactic-semantic value of a text T about a phenomenon P, but a computer equipped with an FNL$^i$ grammar can calculate automatically, exactly and quickly the syntactic-semantic validity and value of a digitization D of an FNL$^i$ text T. Such a computer can be very advantageous for many applications in the field of text processing.

Building a Parsing Machine for FNL$^i$

Since the grammar G(FNL$^i$) has been inductively defined, this grammar can be directly transformed into a purely functional computer language, for instance Haskell. Then we have for free all the benefits and the tools of that computer language, such as:
- the abstraction mechanism,
- the typing mechanism and the type inferencing mechanism, the syntax directed compilation,
the laziness,
the formalisms for describing scanners, semantic routines and parsers,
the available libraries of parser combinators and attribute grammars.

And by consequence, in accordance with the invention a functional parsing machine for any $FNL^i$ can be build.

Figure 5:
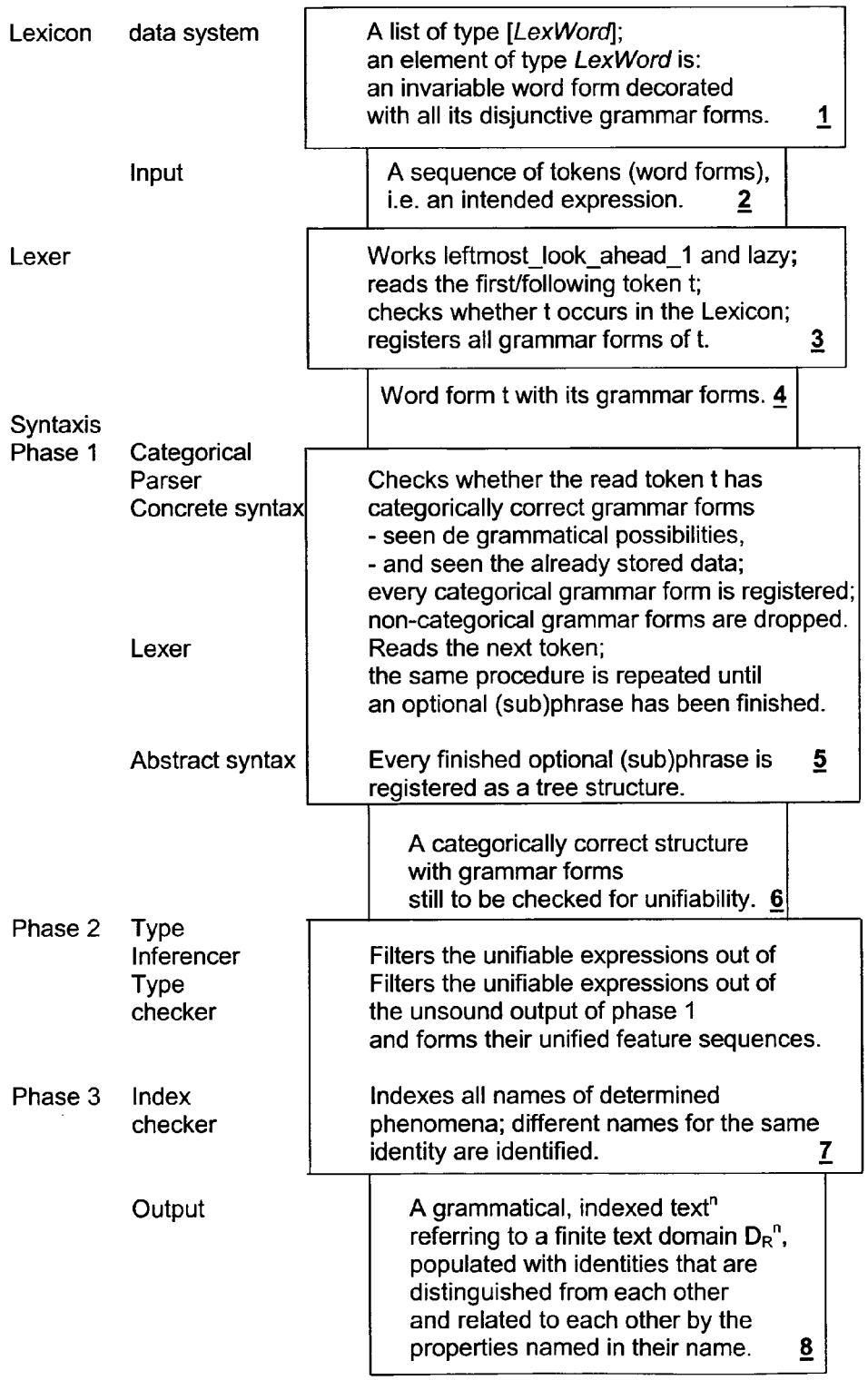
FIG. 5 shows an example of a scheme to build a parser for a Formalized Natural Language $FNL^i$, in accordance with the present invention.

FIG. 5 shows a scheme to build a parser for an $FNL^i$ in accordance with the present invention.

The parsing machine as schematically illustrated in FIG. 5 comprises a plurality of building blocks. Block 1 represents the lexicon, i.e. a data system comprising a list of type [LexWord], wherein an element of type LexWord is an invariable word form decorated with all its disjunctive grammar forms, as disclosed above.

Input block 2 receives a sequence of tokens t (word forms), i.e. an intended $FNL^i$ expression to be parsed.

The lexer block 3 operates leftmost_look_ahead_1 and lazy, and reads the first/following token t, checks whether t occurs in the lexicon, and registers all grammar forms of t. This results in a word form t with its grammar forms, as illustrated by block 4.

Block 5 represents a categorical parser block, wherein it is checked whether the read token t has categorically correct grammar forms in view of the grammatical possibilities, and the already stored data. Every categorical grammar form is registered and non-categorical grammar forms are dropped. This procedure is repeated for every token t read by the lexer (block 3) until an optional (sub)phrase has been finished. Every finished optional (sub)phrase is registered as a tree-structure.

The resultant categorically correct structure with grammar forms, as indicated in block 6, is still to be checked for unifiability, which is to be formed by block 7, i.e. the type inferencer block. This type inferencer filters the unifiable expressions out of the unsound output of block 6 and forms their unified feature sequences. Block 7 also comprises an index checker indexing all syntactically determined phrases with an identifying index, every phrase being a name of an identified phenomenon in the real domain of $text^n$.

Output block 8 of the parser provides a grammatical, indexed $text^n$ referring to a finite text-domain $D_R^n$, populated with identities that are distinguished from each other and related to each other by the properties named in their name.

It will be appreciated that the parser as disclosed above and illustrated in FIG. 5 is to be realized in practice as a computer program and/or computer program product, comprising program code means stored on a medium that can be read and executed by a computer.

Program Structure Diagram for an FNL-Parser

The FNL in accordance with the present invention as defined and explained above, can be advantageously used in several practical computer controlled applications, among which but not limited to grammar based spelling checking, extension of an existing Lexicon during the parsing process, producing unambiguous computer programs (software) directly from a linguistic data input, expressing spoken linguistic data as written text on a display, printed media, etc. but may eventually also result in physical event or signal, such as a control signal for opening a gate, for sounding an alarm, etc. from a spoken command or sentence or other type of linguistic communication.

The FNL according to the invention is particularly well suited for translation purposes, by converting linguistic type data comprising a text of type Text of a first Formalized Natural Language, such as English, into an analogous text of a second Formalized Natural Language, such as Dutch, using both text grammars of the first and second Formalized Natural Language.

Figure 6:
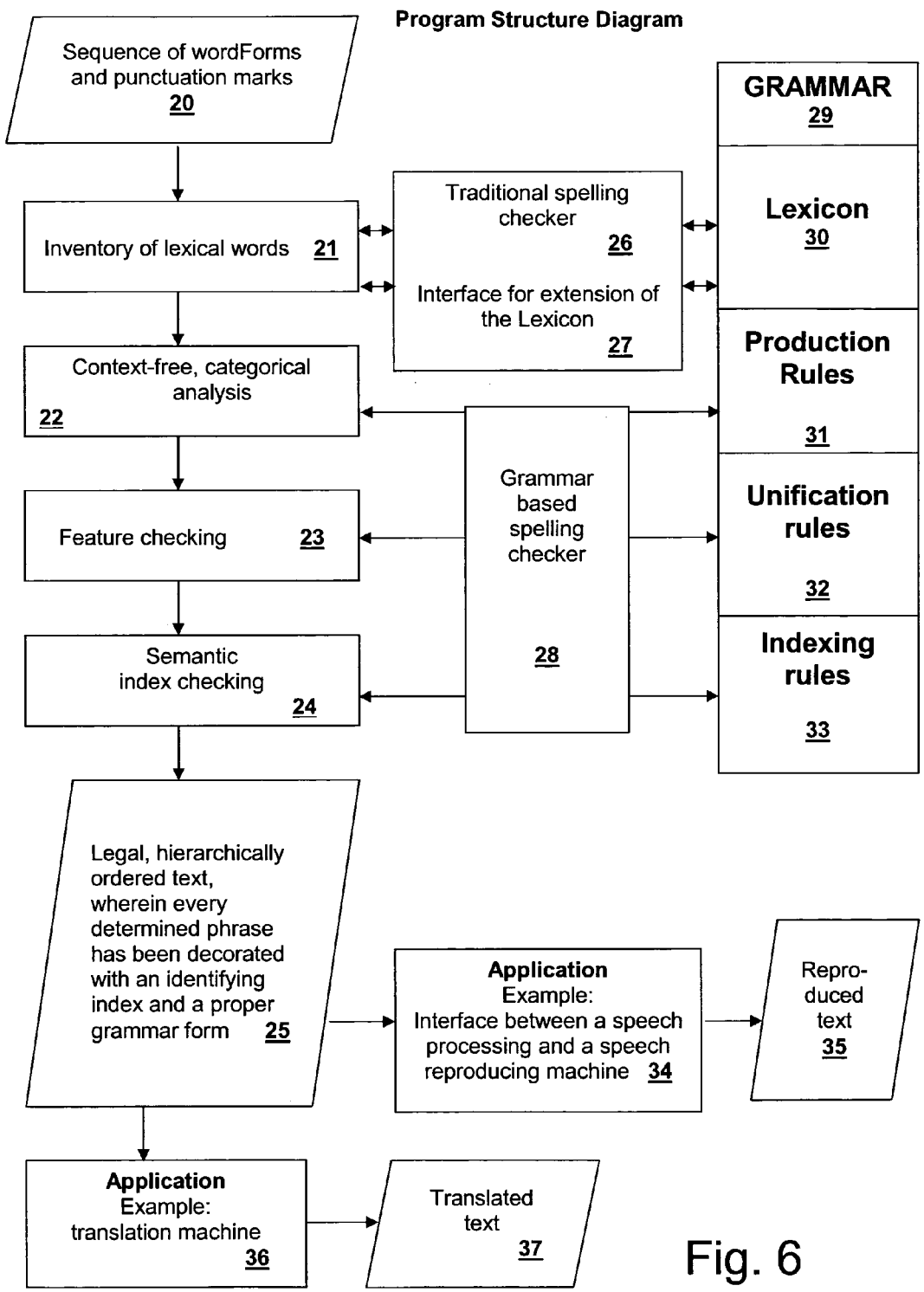
FIG. 6 shows a Program Structure Diagram of several applications based on an FNL-parser, in accordance with the present invention.

FIG. 6 is a program structure diagram, schematically showing applications based on an FNL-parser in accordance with the present invention, for computer controlled implementation thereof.

Input block 20 receives a sequence of word forms and punctuation marks from which, in block 21, an inventory of lexical words is derived. These words may be applied to a traditional spelling checker 26 for a particular language, such as English, for example. Misspelled words may be immediately corrected by the spell checker, or on the basis of agreement by a user, and in connection with a lexicon 30 of a grammar 29 of respective Formalized Natural Language in accordance with the invention. The lexicon 30 may be enhanced from the spelling checker 26 through an interface block 27. The interface block 27 connects both to the spell checker 26 and the lexicon 30.

The lexicon 30 of the FNL is extended during the parsing process in case a string of characters is read but is not recognized as an element of the lexicon and this string should be recognized as a legal element of type LexWord of the FNL.

An expression of the respective FNL is lazily parsed by producing successively grammatical sub-phrases of this expression using the grammar 29 of the FNL, which results in one of a group comprising a failure message and at least one parse tree of the given expression.

The lexical words of the inventory 21 are applied to a context-free, categorical analysis in block 22, feature checking in block 23 and semantic index checking 24, in conjunction with a grammar based spelling checker 28 supported by the production rules, the unification rules and the semantic rules of the grammar 29 of the respective FNL, indicated by blocks 31, 32 and 33, respectively, and as extensively disclosed above.

In block 24 a unique index number is assigned to each concrete and abstract identity for which a determined name is created, in such a way that an indexed identity is identified by this name with the index number and that different names for a same identity receive a same index number.

The grammar-based checking of a text of block 28 is executed during the whole parsing process, in such a way that grammatical mistakes against production rules 31, unification rules 32 and semantic rules 33 of the text grammar of the FNL are reported at the moment they are detected and respective optional improvements can be suggested.

The result of this processing is a legal, hierarchically ordered text, wherein every determined phrase has been decorated with an identifying index and a proper grammar form in accordance with the present invention, i.e. represented by output block 25.

This output text may serve as the input for an Interface 34 between the speech processing and a speech reproducing machine, reproducing the input text at block 20 in spoken form, in written form, as a command or control signal, etc.

In another embodiment of the invention, block 35 is arranged to reproduce or express the linguistic data as an unambiguous computer program referring to phenomena and qualities in a defined domanium reale $D_R^n$ that is a subset of the Universum Reale.

Block 36 illustrates the application as a translation machine, wherein the linguistic data of block 25 comprising a text of type Text of a first Formalized Natural Language are converted into an analogous text of a second Formalized Natural Language, using both text grammars of the first and the second Formalized Natural Language, resulting in a translated text, i.e. block 37.

One skilled in the art of computer programming can realize the above blocks, as device, comprising computer processing means, arranged for performing the steps and functions disclosed.

The Parsing of Another Example Text$^k$

At last we will illustrate the parsing of another, more complicated example text$^k$ with a parser built in accordance with FIG. 5 on the basis of the grammar G(FNL$^E$).

Assume that a creative author has produced the following text$^k$ on the basis of the grammar G(FNL$^E$), represented in code as:

Cartesian Philosophy
Do you know that famous Descartes?
When you are thinking anxiously
about to be or not to be,
remember this philosophy:
"You think, you are, be free!"

A computer equipped with a functional parser for FNL$^E$ can analyze this text$^k$ as a legal element of language FNL$^E$, and can also produce a physical representation of this grammatical analysis, in such a way that every determined phrase is embedded between parentheses ( ) and is decorated with its proper index and, if you want, with its unified features. Such a physical representation of any text is called a "gramprint". The gramprint of the text above will be:

---

1 (Cartesian  ( Do (you)$^2$ know (that famous Descartes)$^4$ )$^3$ ?
philosophy)$^1$
[ 2 (you)$^2$   ( When ( (you)$^2$ are thinking anxiously
                about ( (to be)$^8$ or (not to be)$^9$ )$^7$
              )$^6$,
              remember   ( (this philosophy)$^{10}$:
                        (   2.1 (you)$^2$ "((you)$^2$ think)$^{11}$,
                            [ 2.2 (you)$^2$ ((you)$^2$ are)$^{12}$,
                              [ 2.3 (you)$^2$ (be free)$^{13}$ !" [ ]
                            ]
                        ]
                        )$^{10}$
                     )$^{10}$
              )$^5$ [ ]
]

---

Observations Clarifying this Gramprint:
The title of this text is interpreted as the topic of the first text sentence. With regard to the topic of a text the following points have to be respected:
The topic of any text has to be an indexed, determined phrase.
The topic of the first modal sentence 1 of a text$^n$ is always the topic/title of the whole text$^n$.
The topic of modal sentence 1 does not need to perform in this sentence 1; the relation between this topic and this sentence 1 has to become clear in the course of the whole text.
The topic of every new modal sentence (n+1) has to be chosen out of the determined phrases of foregoing modal sentences; such a topic has to perform in actual fact in the new dependent text and is thus responsible for the hierarchical ordering of the text. A new modal sentence is directly dependent on the modal sentence from which its topic is borrowed.
The topic of every text has to be considered as "known material of the text-domain", and therefore it will not receive the focus by a heavy intonation accent in the sentence wherein it is used. Usually, most accents in a written text are omitted.

The grammar G(FNL$^E$) has a rule saying that the subject ($_{DNP}$you$_{[meaning]}$)$^i$ of an imperative modal sentence can be empty/omitted.

The second (inverted-imperative) text sentence has (this philosophy)$^{10}$ as an object phrase, followed by a colon that introduces an enumeration of three sentences; this enumeration is interpreted as a new embedded text and as an apposition to (this philosophy)$^{10}$ (i.e. as an other name for the same phenomenon$^{10}$).

Note the fact that the noun phrase (you)$^2$ in this whole text remains ambiguous. Its features will be computed as ($_{DNP}$ you $_{[["2.1", "3.SP", "5.2", "7.Y", "8.MF"]]}$)$^2$, because this noun phrase can be interpreted in four different disjunctive contexts as (singularis and (masculine or feminine)) or (pluralis and (masculine or feminine)). But this (open) ambiguity is optionally disjunctive, contextually informative and not objectionable.

Note that the last sentence of the whole text and the last sentence of the embedded text both are closed off with an empty list of type [Text].

So this text$^n$ is syntactically and semantically analyzed by the computer as a nominal domain D$_N^n$, comprehending:
the whole text$^n$ being a complex name denoting a domanium reale D$_R^n$ containing many inter-related phenomena arranged around mentioned (Cartesian philosophy)$^1$,
several embedded sub-texts, where every sub-text is the name of a random picture of the domain of said subtext,
the presumed name of the ego/author$^0$, (always present, here not mentioned explicitly),
the twenty-one different, not-indexed, elementary property-names in this text,
six attributed, not-indexed, complex property-names of type AVP or AJP or PP,
thirteen complex, indexed names (of type DNP or DVP) of concrete or abstract phenomena.

Every name ($\in$D$_N^n \subset \wp$(U$_N$)) refers to a determined phenomenon ($\in$D$_R^n \subset$U$_R$), because every name indicates the properties by which its intended identity in D$_R^n$ can be identified, given the conventions of the used FNL$^E$.

Now, when all the structural information (i.e. sentence-numbers, topics, parentheses, indexes and grammatical features) of this parsed structure is hided, the text results as it was originally coded by the author.

Other Provisions of the Invention

The lexicon according to the invention, in a further embodiment thereof, is stored in a computer readable data form on a medium that can be read by a computer, which computer operates to carry out the method according to the invention.

The invention provides further for a computer program, comprising program code means, which computer program functions to carry out the steps and processing according to the invention, when loaded in a working memory of a computer and executed by the computer. The computer program may be arranged for being integrated in or added to a computer application for joint execution of the computer program and the computer application by a computer. The computer program may be arranged as program code means stored on a medium that can be read by a computer, and arranged for integrating the program code means in or adding the program code means to a computer application for joint execution of the program code means and the computer application by a computer.

The present invention may be provided as a computer program product, which may include a machine-readable medium having stored thereon instructions which may be used to program a computer (or other electronic devices) to perform a process according to the present invention. The machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electromagnetic Erasable Programmable Read Only Memories), magnetic or optical cards, flash memory, or other type of media/machine-readable medium suitable for storing electronic instructions.

Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, a carrier wave shall be regarded as comprising a machine-readable medium.

Figure 7:
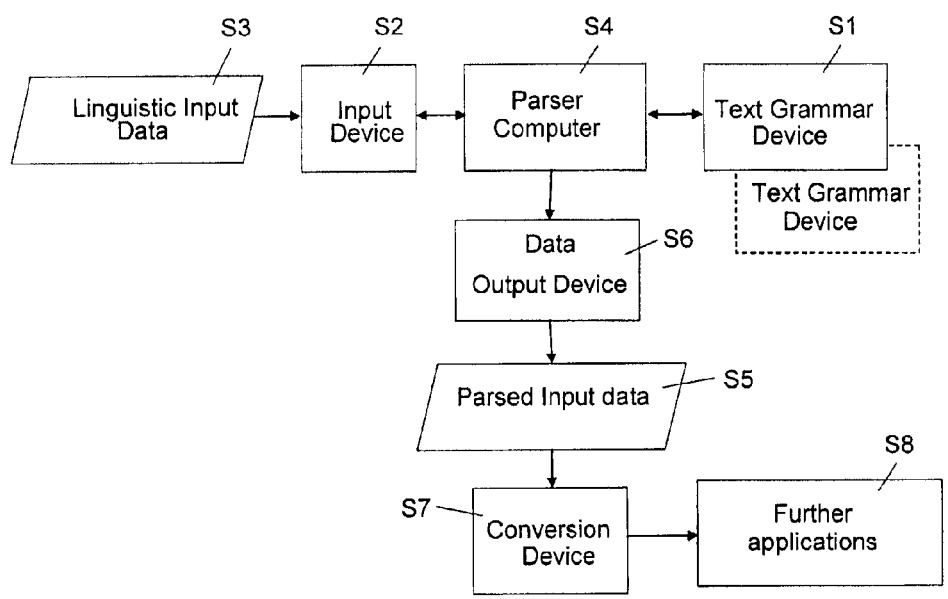
FIG. 7 shows, in a flowchart type diagram, computer controlled data exchange between various data devices in accordance with the present invention.

The flowchart type diagram of FIG. 7 illustrates data exchange between various data devices in computer controlled parsing of linguistic input data, using a Formalized Natural Language in accordance with the invention.

In a first step, in a computer or machine-readable medium, data in electronic form are stored, which data comprise a text grammar of a Formalized Natural Language representing an infinite set of texts of type Text, such that the computer readable medium and the data stored constitute a text grammar device, S1. A plurality of text grammar devices may be formed, each representing a text grammar device of a different Formalized Natural Language, $FNL^1$, illustratively represented by broken lines in FIG. 7.

From an input device, S2, such as but not limited to a keyboard, a computer touch screen or display, a microphone or an electronic data device, linguistic input data, S3, are received by a computer or data processing device, S4.

Under the control of the computer or data processing device S4, the received linguistic input data S3 are parsed in accordance with the text grammar of the Formalized Natural Language of a text grammar device S1. The thus parsed linguistic input data, S5, are outputted from a data output device, S6, under control of the computer or data processing device S4.

The data output device may output the parsed linguistic input data as a gramprint, as Venn-diagrams, and the parsed linguistic input data may be provided to a conversion device, S7, arranged for outputting the parsed input data as spoken linguistic data, as written linguistic data, for example. The parsed input data may also be converted by the conversion device S7 into an analogous text of another Formalized Natural Language in accordance with another text grammar device or as input data for other type of application devices, illustrated by reference S8.

The invention is not limited to the examples and embodiments disclosed above and the accompanying drawings. Those skilled in the art will appreciate that many additions and modifications can be made based on the inventive idea embodied in the present description and drawings, which additions and modifications are to be comprised by the attached claims.

The invention claimed is:

1. A computer controlled method for parsing linguistic input data in a computer, said method comprising the steps of:
    storing, in a computer readable storage medium of said computer, data comprising a text grammar of a Formalized Natural Language, the text grammar comprising a finite set of elements that represent a set of texts of a human language, wherein said text grammar of said Formalized Natural Language defines a finite set W of words of type Word which is stored in a lexicon of type Lexicon, comprising a finite set of lexical words of type LexWord, in such a way that each lexical word is constructed as a tuple of one unique word form and a list of disjunctive grammar forms, and each grammar form is constructed as a tuple of a unique category and a list of disjunctive feature sequences, and every feature is constructed as a string referring to a set of disjunctive instances of a feature,
    receiving by said computer said linguistic input data to be parsed,
    parsing said received linguistic input data by said computer in accordance with said text grammar of said Formalized Natural Language, and
    generating parsed linguistic output data that is consistent for every instance when said linguistic input data is provided to said computer.

2. The method according to claim 1, wherein said finite set of elements is a set of four elements W, N, R and Text, wherein:
    W is a finite set of invariable words of type Word, to be used as terminal, elementary expressions of a text,
    N is a finite set of non-terminal help symbols, to be used for the derivation and the representation of texts,
    R is a finite set of inductive rules for the production of grammatical expressions of said Formalized Natural Language, and
    Text is an element of N and start-symbol for grammatical derivation of all texts of type Text of said Formalized Natural Language.

3. The method according to claim 1, wherein said generating parsed linguistic output data comprises providing a gramprint of said linguistic input data, said gramprint comprising a physical representation of parsed syntactic and semantic relations between all words used in said linguistic input data parsed by said computer.

4. The method according to claim 1, wherein said generating parsed linguistic output data comprises providing a gramprint of said linguistic input data parsed by said computer, said gramprint comprising a physical representation of parsed syntactic and semantic relations between all phrases used in said linguistic input data parsed by said computer as an hierarchically ordered system of syntactically typed phrases wherein every phrase P is functionally transformed in a name referring to a set of phenomena realizing a property called "to be P", in such a way that every syntactically determined phrase in particular, which is constructed with a determiner, is marked with a unique index indicating that said determined phrase is a name referring to a singleton set comprehending one phenomenon of which the unique identity can be distinguished and recognized by the properties named in the name of said singleton set, according to the grammar of said Formalized Natural Language of a text grammar device.

5. The method according to claim 1, wherein said generating parsed linguistic output data comprises providing a hierarchically ordered sequence of Venn-diagrams in such a way that every text sentence of said linguistic input data parsed by said computer is represented by a Venn diagram that represents every syntactical phrase P of said text sentence as a set S of phenomena realizing a property called "to be P", according to the grammar of said Formalized Natural Language of a text grammar device.

6. The method according to claim 1, wherein said generating parsed linguistic output data comprises providing a hierarchically ordered sequence of Venn-diagrams in such a way that every text sentence of said linguistic input data parsed by said computer is represented by a Venn diagram that represents every syntactical phrase P of said text sentence as a set S of phenomena realizing a property called "to be P", and wherein a Venn-diagram of a text sentence represents in particular every syntactically determined phrase P of a current text sentence as an indexed singleton set comprehending a phenomenon of which an identity can be distinguished and recognized by properties named in names of cross sections of said singleton set, according to the grammar of said Formalized Natural Language of a text grammar device.

7. The method according to claim 1, wherein said text grammar of said Formalized Natural Language defines a word of type Word as an invariable molecule of one word form of type WordForm and one grammar form of type GrammarForm, wherein said word form is an invariable string of type String of at least one character of a character alphabet used in said Formalized Natural Language, and said grammar form is a set of grammatical features, said set containing a category of type Category and a meaning of type Meaning.

8. The method according to claim 1, wherein said text grammar of said Formalized Natural Language defines a category of type Category as a string of at least one character of type Character, which string refers to a position that a corresponding word form of a current word of said linguistic input data parsed by said computer can take up in syntactic phrases according to said text grammar of said Formalized Natural Language of a text grammar device.

9. The method according to claim 1, wherein said text grammar of said Formalized Natural Language defines a meaning of type Meaning by comprising a list of features of type Feature, which list of features refers to a choice of grammatical conditions wherein a categorically typed word form of a current word of said linguistic input data parsed by said computer can get a reference to an intended set of phenomena sharing a same property, according to said text grammar of said Formalized Natural Language of a text grammar device.

10. The method according to claim 1, wherein said text grammar of said Formalized Natural Language defines a feature of type Feature as a code of type String which code refers to a single, determined grammatical condition that can be met by a set of instances of said condition, according to said text grammar of said Formalized Natural Language of a text grammar device.

11. The method according to claim 1, wherein said text grammar of said Formalized Natural Language axiomatically defines an elementary phrase as a word that is syntactically selected from a lexicon of said Formalized Natural Language and wherein all phrases are inductively generated according to a set of production rules of said text grammar of said Formalized Natural Language of a text grammar device.

12. The method according to claim 1, wherein said computer generates syntactic phrases of said Formalized Natural Language according to a set of recursive, context-free production rules of the form XP→ UP . . . ZP, wherein XP is a category-type of a phrase to be generated by a function xp taking respectively as arguments an element of types UP, . . . , ZP, in such a way that a result of said function xp is of type (String, (XP, [Meaning]), wherein String represents a concatenation of word forms of selected elements of the respective types UP, . . . , ZP and where Meaning represents a type of a result of grammatical rules for unification of meanings of said selected elements of type UP, . . . , ZP, according to said text grammar of said Formalized Natural Language of a text grammar device.

13. The method according to claim 1, wherein said text grammar of said Formalized Natural Language defines a Formalized Natural Language as a set of all and only syntactic phrases of type Text, wherein a text of type Text is a recursive function of a modal sentence of a data type ModalSentence and a dependent list of type Text, according to said text grammar of said Formalized Natural Language of a text grammar device, such that:

→Text→ModalSentence[Text].

14. The method according to claim 1, wherein said text grammar of said Formalized Natural Language defines an element of a data type ModalSentence by representing a constructor of type Constructor and an abstract sentence of type AbstractSentence, where a constructor of type Constructor defines a concrete, modal form in which a given abstract sentence can be transformed by said computer by a function text, according to said text grammar of said Formalized Natural Language of a text grammar device, such that:

data ModalSentence=Constructor AbstractSentence.

15. The method according to claim 1, wherein said text grammar of said Formalized Natural Language defines an abstract sentence of type AbstractSentence is defined as a tuple of five arguments of a function text, wherein said arguments are respectively of types Integer, Topic, Subject, InflexionData and DictumPredicativum, wherein an integer of type Integer indicates an order of a current modal sentence in a recursively produced text, a topic of type Topic is a function of an already given determined phrase, a subject of type Subject is a function of a determined phrase that must be marked for casus 1, a dictum predicativum of type DictumPredicativum is a function of a definite verb phrase, not yet marked for any casus, with its objects and adjuncts, and inflexion data of type InflexionData is a set of coded strings needed for a functional production of a concrete modal form of a text sentence, according to said text grammar of said Formalized Natural Language of a text grammar device, such that:

type AbstractSentence=(Integer, Topic, Subject, InflexionData, DictumPredicativum).

16. The method according to claim 1, wherein said text grammar of said Formalized Natural Language defines a dictum predicativum of type DictumPredicativum as a function of a definite verb phrase with its objects and adjuncts, in such a way that sub-phrases of said dictum predicativum are ordered as they have to be modally applied on a grammatical subject of type Subject, according to a current constructor of said text grammar of said Formalized Natural Language of a text grammar device.

17. The method according to claim 1, wherein said text grammar of said Formalized Natural Language defines a subject of type Subject as a function of a determined phrase that must be marked for casus 1 and to which the dictum predicativum has to be modally applied by a function text in order to generate a concrete modal sentence in accordance with a given constructor according to said text grammar of said Formalized Natural Language of a text grammar device, such that:

→ModalSentence→AbstractSentence ConcreteSentence.

18. The method according to claim 1, wherein said text grammar of said Formalized Natural Language defines a topic of type Topic as an already given determined indexed phrase, performing as an element of an abstract sentence heading a text T and acting as a title of said text T, in such a way that every topic has to be explicitly present in said text T, and such that every topic of a dependent text must be borrowed from a previous concrete modal sentence higher up in a text tree according to said text grammar of said Formalized Natural Language of a text grammar device.

19. The method according to claim 1, wherein said text grammar of said Formalized Natural Language defines a function sem by assigning a semantic value to every word w of said linguistic input data parsed by said computer, which word w has been syntactically selected as an elementary phrase of a text sentence, such that said word w becomes a name referring to a set of well known phenomena realizing a same property called "to be w", which name is interpretable under given contextual conditions according to said text grammar of said Formalized Natural Language of a text grammar device, in such a way that said function sem projects a set of elementary phrases to a set called Universum Nominale comprising all elementary names, each name referring to a set of well known phenomena that are presumed to realize the property called "to be w".

20. The method according to claim 1, wherein said text grammar of said Formalized Natural Language defines a function sem inducing a function sem* assigning a semantic value to every syntactic phrase of a text T, such that each phrase becomes a name referring to a set of phenomena identified within said text T and presumed to be realizing a property called with said name, which name is interpretable by said computer under given contextual conditions according to said text grammar of said Formalized Natural Language of a text grammar device, in such a way that said function sem* projects a set of all syntactic phrases to a set of all grammatical names, each name referring to a set of well known phenomena that are presumed to realize a property called with said name, such that said function sem* reveals an assumed set called Universum Reale comprising concrete and abstract, well known phenomena to which users of said Formalized Natural Language may refer with grammatical names, each name being an element of a sub-set of a power-set of the Universum Nominale.

21. The method according to claim 1, wherein an expression of said Formalized Natural Language is lazily parsed by said computer by producing successively grammatical sub-phrases of said expression using said text grammar of said Formalized Natural Language, said parsing providing as output data by a data output device one of a group comprising a failure message and at least one parse tree of said given expression.

22. The method according to claim 1, wherein a unique index-number is assigned to each identified phenomenon for which a syntactically determined name has been created in a text T being parsed by said computer in accordance with said text grammar of said Formalized Natural Language, in such a way that an indexed identity is identified by said name with said index-number and that different names for a same identity receive a same index-number within text T.

23. The method according to claim 1, wherein a grammar-based spelling check is executed during said parsing process by said computer in accordance with said text grammar of said Formalized Natural Language, in such a way that grammatical mistakes against one rule of a group comprising production-rules, unification rules and indexing rules of a text grammar device are reported and respective optional improvements are suggested by a data output device.

24. The method according to claim 1, wherein a lexicon of a Formalized Natural Language is extended during said parsing process by said computer in accordance with said text grammar of said Formalized Natural Language in case a string of characters is read but is not recognized as an element of said lexicon and said string should be recognized as a legal element of type Word of said Formalized Natural Language of a text grammar device.

25. The method according to claim 1, wherein a text T of a Formalized Natural Language is expressed as a computer program comprehending a hierarchically ordered domanium nominale DNT that is a proper sub-set of a power-set of a universum nominale UN and that refers unambiguously to a domanium reale DRT that is a presumed proper sub-set of an assumed universum reale UR, in such a way that there is a bijective relation between DNT and DRT.

26. The method according to claim 1, wherein spoken linguistic input data parsed by said computer in accordance with said text grammar of said Formalized Natural Language are outputted as written linguistic output data.

27. The method according to claim 1, wherein linguistic input data comprising a text of type Text of a first Formalized Natural Language are converted by said computer into an analogous text of a second Formalized Natural Language.

28. The method according to claim 1, wherein written linguistic input data parsed by said computer in accordance with said text grammar of said Formalized Natural Language of a text grammar device are outputted as spoken linguistic output data.

29. A device comprising:
   a computer readable storage medium storing data comprising a text grammar of a Formalized Natural language, the text grammar comprising a finite set of elements that represent a set of texts of a human language, wherein said text grammar of said Formalized Natural Language defines a finite set W of words of type Word which is stored in a lexicon of type Lexicon, comprising a finite set of lexical words of type LexWord, in such a way that each lexical word is constructed as a tuple of one unique word form and a list of disjunctive grammar forms, and each grammar form is constructed as a tuple of a unique category and a list of disjunctive feature sequences, and every feature is constructed as a string referring to a set of disjunctive instances of a feature,
   an input device for receiving said linguistic input data to be parsed,
   processing means for parsing said received linguistic input data in accordance with said text grammar of said Formalized Natural Language, and
   a data output device for outputting parsed linguistic data, wherein said parsed linguistic data is consistent for every instance when said linguistic input data is provided to said input device.

30. A computer readable storage medium that is not a transient signal, the computer readable medium storing instructions for parsing linguistic input data, said instructions executable for:
   receiving said linguistic input data to be parsed,
   parsing said linguistic input data using a lexicon of a Formalized Natural Language, the lexicon accessible by a computer for parsing linguistic input data, the lexicon comprising a finite set of lexical words of type LexWord in such a way that one lexical word contains all the different words of type Word with one common word form, which word form is able to satisfy a given list of different disjunctive grammar forms, each grammar form given as a tuple of a unique category and a list of all its disjunctive meanings, every meaning constituting a feature sequence wherein each feature is constructed as a string indicating disjunctive instances of said feature, and outputting parsed linguistic data, wherein said parsed linguistic data is consistent for every instance when said linguistic input data is provided to said computer.

31. A computer program, comprising program code stored in a computer-readable storage medium that is not a signal, the program code executable by a computer to carry out the method according to claim 1.

32. A computer program, comprising program code stored in a computer-readable storage medium that is not a signal, the program code executable by a computer to carry out the method according to claim 1, the program code arranged for being integrated in or added to a computer application for joint execution of said computer program and said computer application by said computer.

33. A computer program product comprising program code stored on computer-readable storage medium that is not a signal, the program code readable by a computer, which operates to carry out the method according to claim 1, when said program code is executed by said computer.

34. A computer program product comprising program code stored on computer-readable storage medium that is not a signal, the program code readable by a computer, which is operable to carry out the method according to claim 1, and further comprising integrating said program code into a computer application for joint execution of said program code and said computer application by said computer.

* * * * *

UNITED STATES PATENT AND TRADEMARK OFFICE
CERTIFICATE OF CORRECTION

PATENT NO.       : 8,515,733 B2                                              Page 1 of 1
APPLICATION NO.  : 12/446232
DATED            : August 20, 2013
INVENTOR(S)      : Wilhelmus Johannes Josephus Jansen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1117 days.

Signed and Sealed this
Fifteenth Day of September, 2015

Michelle K. Lee
*Director of the United States Patent and Trademark Office*